(12) United States Patent
Lee et al.

(10) Patent No.: US 8,022,925 B2
(45) Date of Patent: Sep. 20, 2011

(54) METHOD FOR CONFIGURING 3D INPUT DEVICE, METHOD FOR RECONFIGURING 3D INPUT DEVICE, METHOD FOR RECOGNIZING WEARING OF THE 3D INPUT DEVICE, AND THE APPARATUS THEREOF

(75) Inventors: Sang-goog Lee, Anyang-si (KR); Tae-sik Park, Suwon-si (KR); Byung-Seok Soh, Suwon-si (KR); Sung-cheol Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 511 days.

(21) Appl. No.: 10/540,925

(22) PCT Filed: Dec. 26, 2003

(86) PCT No.: PCT/KR03/02850
§ 371 (c)(1),
(2), (4) Date: May 12, 2006

(87) PCT Pub. No.: WO2004/059572
PCT Pub. Date: Jul. 15, 2004

(65) Prior Publication Data
US 2006/0202950 A1 Sep. 14, 2006

(30) Foreign Application Priority Data
Dec. 31, 2002 (KR) .......... 10-2002-0087939

(51) Int. Cl.
*G09G 5/00* (2006.01)

(52) U.S. Cl. ........... 345/156; 345/157

(58) Field of Classification Search .......... 345/156, 345/474, 863; 382/106
See application file for complete search history.

(56) References Cited

U.S. PATENT DOCUMENTS

| 4,414,537 A | 11/1983 | Grimes |
| 4,988,981 A | 1/1991 | Zimmerman et al. |
| (Continued) | | |

FOREIGN PATENT DOCUMENTS

JP 07-013690 A 1/1995
(Continued)

OTHER PUBLICATIONS

European Search Report issued on Jan. 11, 2011 in the corresponding European Patent Application No. 03779023.5.

(Continued)

*Primary Examiner* — Quan-Zhen Wang
*Assistant Examiner* — Yuk Chow
(74) *Attorney, Agent, or Firm* — Sughrue Mion, PLLC

(57) ABSTRACT

Provided are a method for configuring a three-dimensional (3D) input device, a method for reconfiguring the 3D input device, a method for recognizing wearing of the 3D input device, and an apparatus for the same. The method of configuring a three-dimensional (3D) input device, which performs information input operations using a finger device that is worn by a user and senses the user's finger movement, includes recognizing whether the user is wearing the finger device and recognizing the finger positions of the device, and adaptively configuring the 3D input device based on the recognition results. Thus, it is possible to implement a user-friendly 3D input device by automatically or manually configuring the 3D input device.

27 Claims, 32 Drawing Sheets

U.S. PATENT DOCUMENTS

| | | | |
|---|---|---|---|
| 5,097,252 A | 3/1992 | Harvill et al. | |
| 5,638,092 A * | 6/1997 | Eng et al. | 345/158 |
| 6,075,517 A * | 6/2000 | Frid | 345/156 |
| 6,088,017 A * | 7/2000 | Tremblay et al. | 345/156 |
| 6,128,004 A | 10/2000 | McDowall et al. | |
| 6,261,247 B1 * | 7/2001 | Ishikawa et al. | 600/587 |
| 6,380,923 B1 * | 4/2002 | Fukumoto et al. | 345/156 |
| 6,407,679 B1 | 6/2002 | Evans et al. | |
| 6,424,334 B1 | 7/2002 | Zimmerman et al. | |
| 6,512,838 B1 * | 1/2003 | Rafii et al. | 382/106 |
| 6,515,669 B1 * | 2/2003 | Mohri | 345/474 |
| 6,766,036 B1 * | 7/2004 | Pryor | 382/103 |
| 2002/0012014 A1 * | 1/2002 | Mohri | 345/863 |
| 2002/0130844 A1 | 9/2002 | Natoli | |
| 2003/0011573 A1 | 1/2003 | Villet et al. | |
| 2003/0214481 A1 * | 11/2003 | Xiong | 345/157 |

FOREIGN PATENT DOCUMENTS

| | | |
|---|---|---|
| JP | 2001-125728 A | 5/2001 |
| JP | 2001-236174 A | 8/2001 |
| JP | 14-259017 | 9/2002 |
| JP | 2002-278673 A | 9/2002 |

OTHER PUBLICATIONS

European Examination Report, dated Jun. 22, 2011, issued in Application No. 03 779 023.5.

* cited by examiner

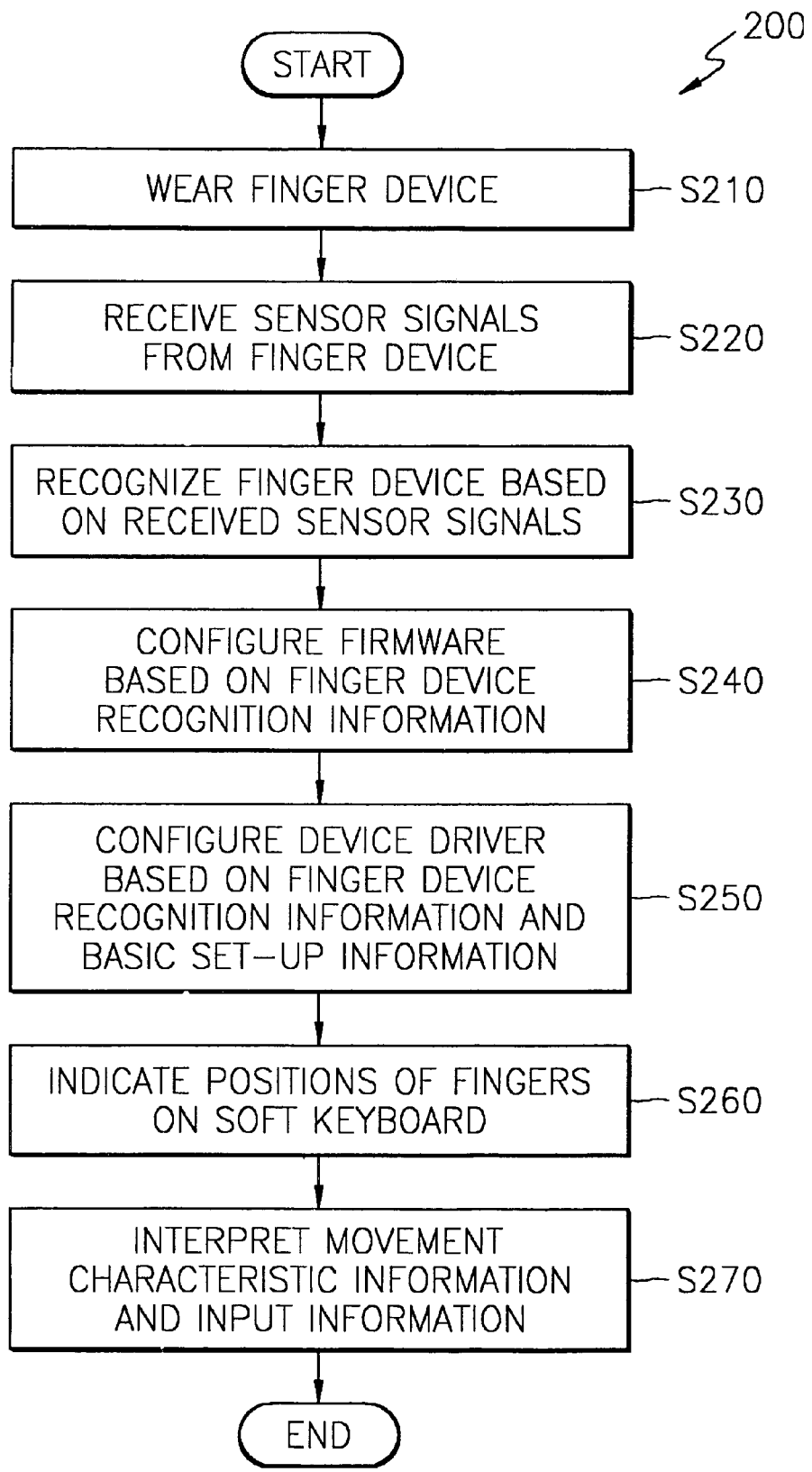

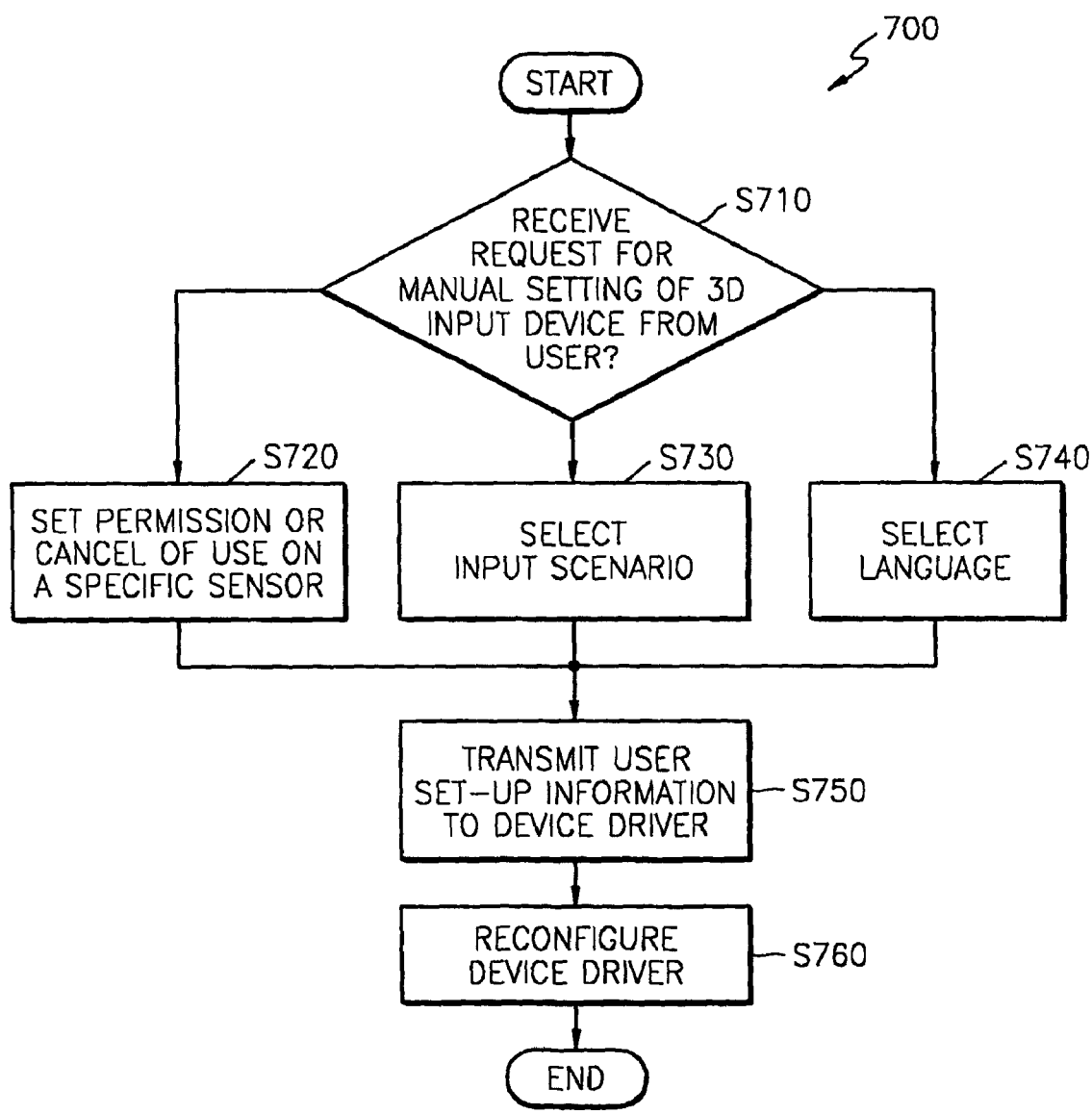

FIG. 15E

| INPUT COUNTER | CURRENT_INPUT | LAST_INPUT | VXOR | TRANSITION_COUNTER | PORT_STATUS[ ] | EVENT_TIME[ ] |
|---|---|---|---|---|---|---|
| 0 | 0000 0101 | | | | 0111 0010 | 10 |
| 1 | 0000 0111 | 0000 0101 | 0000 0000 | 1 | 1111 1000 | 50 |
| 2 | 0000 1111 | 0000 0111 | 0000 1000 | 2 | 1110 0001 | 130 |
| 3 | 0000 1110 | 0000 1111 | 0000 0001 | 3 | 1010 0100 | 160 |
| 4 | 0000 1010 | 0000 1110 | 0000 0010 | 4 | 1000 0010 | 170 |
| 5 | 0000 1000 | 0000 1010 | 0000 1000 | 5 | 0000 1000 | 210 |
| 6 | 0000 0000 | 0000 1000 | 0000 1000 | 6 | 0001 0001 | 280 |
| 7 | 0000 0001 | 0000 0000 | 0000 0001 | 7 | 0101 0100 | 300 |
| 8 | 0000 0101 | 0000 0001 | 0000 0100 | 8 | 0111 0010 | 320 |
| 9 | 0000 0111 | 0000 0101 | 0000 0010 | 9 | 1111 1000 | 360 |
| 10 | 0000 1110 | 0000 0111 | 0000 1000 | 10 | 1110 0001 | 430 |
| 11 | 0000 1010 | 0000 1110 | 0000 0001 | 11 | 1010 0100 | 450 |
| | | | 0000 0100 | 12 | | |

FIG. 16D

| Init_Edge_Status | X1 | X2 | X3 | X4 |
|---|---|---|---|---|
|  | 0 | 1 | 0 | 1 |
| Time[0] | 130 | 10 | 160 | 50 |
| Time[1] | 280 | 170 | 300 | 210 |
| Time[2] | 430 | 320 | 450 | 360 |

| NO_EXIST_SIGNALS | 0 | 0 | 0 | 0 | 0 | 0 | 0 | 0 |

+

| BIT_MASK | 0 | 0 | 0 | 0 | 0 | 0 | 0 | 1 |

---

| NO_EXIST_SIGNALS | 0 | 0 | 0 | 0 | 0 | 0 | 0 | 1 |

+

| 1-BIT LEFT SHIFTED BIT_MASK | 0 | 0 | 0 | 0 | 0 | 0 | 1 | 0 |

---

| NO_EXIST_SIGNALS | 0 | 0 | 0 | 0 | 0 | 0 | 1 | 1 |

↑ ↑ ↑ ↑
X4 X3 X2 X1

SENSOR OUTPUTTING ERROR VALUE

METHOD FOR CONFIGURING 3D INPUT DEVICE, METHOD FOR RECONFIGURING 3D INPUT DEVICE, METHOD FOR RECOGNIZING WEARING OF THE 3D INPUT DEVICE, AND THE APPARATUS THEREOF

This application claims the benefit of Korean Patent Application No. 10-2002-0087939, filed-on Dec. 31, 2002, in the Korean Intellectual Property Office, the disclosure of which is incorporated herein in its entirety by reference.

BACKGROUND OF THE INVENTION

1. Field of the Invention

The present invention relates to a method for configuring a three-dimensional (3D) input device, a method for reconfiguring the 3D input device, a method for recognizing wearing of the 3D input device, and an apparatus thereof.

2. Description of the Related Art

Korean Patent Publication No. 1998-36079 discloses a glove interface device for inputting digital data, which includes a glove, which compares digital sensors and 3D sensors on fingers, for outputting digital data indicating touch status between fingers, position and rotation of a hand and a processor for detecting information including the touch status between fingers, the position and rotation of the hand based on the digital data received from the glove and providing the detected information to a host computer.

Korean Patent Publication No. 1998-36077 discloses a digital glove input device, which includes a sensor block, placed on the fingers, senses a finger crooking signal generated with respect to a user's finger crooking and detects finger crooking information in response to the finger crooking signal. The digital glove input device also includes a control block which generates a motion control signal based on the detected finger crooking information.

In addition, Japanese Patent Publication No. 1996-272520 discloses glove instruction call-originating equipment, which includes an extension/contraction detecting sensor and a movement recognizing part. The sensor is attached to the finger part, the back part, and the palm part of a glove, and simultaneously inputs signals of respective sensors. The movement recognizing part continuously processes a group of input signal patterns and synthesizes the provided results so as to judge and decide on a certain instruction.

As described above, there have been many studies involving the development of devices for inputting information to a computer using the hands or fingers of a user. Some of these devices have already experienced real life application.

Skill level and method of inputting information through a general keyboard vary with respect to users. Some users may input information through a QWERTY keyboard using only the two index fingers of both hands, or four or six fingers of both hands. Others skilled in the QWERTY keyboard may input information using all the fingers of both hands.

Likewise, the skill level and method for inputting information in 3D space using a hand-attached device vary with respect to users. Therefore, in an input device including ten finger elements for all fingers of both hands, some users may want to use only four or six finger elements of both hands. Some users may be forced to use only several finger elements due to mechanical failures in the rest of the finger elements.

However, there has not been any disclosure of a 3D input device which adaptively self-reconfigures finger elements. It is, thus, required to develop a 3D input device capable of adaptively self-reconfiguring the finger elements, resulting in improvement in user convenience. Adaptive self-reconfiguration may be needed in situations in which a user wants to select which finger elements to use or is forced to use only a few of the finger elements due to mechanical failures in the reset of the finger elements.

Adaptive self-reconfiguration may also be needed in situations in which a user wants to deactivate a specific finger element when wearing the 3D input device, so as to change a key array of a keyboard in user or to change a language. Currently, there are no disclosures of technology that can determine whether the user is wearing the finger elements and determine the positions of the finger elements. For example, as shown in FIG. 20, if a sensor X1 attached to a finger element is malfuctioning and could not generate an edge signal, a recognizing unit of the finger element is unable to recognize the finger device. The recognizing unit is designed to sequentially recognize sensors X1, X2, X3, and X4. When the sensor X1 malfunctions, it continuously circulates a loop and then cannot determine whether the user is wearing the finger elements and the positions of the finger elements. Therefore, the 3D input device cannot be entirely used even when only one finger element is malfunctioning.

SUMMARY OF THE INVENTION

The present invention provides a method for configuring a three-dimensional (3D) input device, a method for reconfiguring the 3D input device, and an apparatus thereof, which allows improvement in user convenience.

The present invention also provides a method for recognizing wearing of the three-dimensional (3D) input device and an apparatus thereof, which recognizes whether a user is wearing the 3D input device and recognizes the finger element positions of the 3D input device. According to an aspect of the present invention, there is provided a method of configuring a three-dimensional (3D) information input device which performs information input operations using a finger device that is worn by a user and senses the user's finger movement. The method comprises steps of recognizing whether the user is wearing the finger device and recognizing finger positions of the finger device and adaptively configuring the 3D input device based on the recognition results.

According to another aspect of the present invention, there is provided a method of reconfiguring a three-dimensional (3D) information input device, which inputs information by using a finger device that is worn by a user and senses the user's finger movement. The method comprises receiving reset information, used for reconfiguration of the 3D information input device, from a user through a user interface and reconfiguring a device driver of the 3D input device based on the received reset information.

According to yet another aspect of the present invention, there is provided a method of recognizing whether a user is wearing a three-dimensional (3D) input device, which includes a finger device with a plurality of sensors attached thereto that sense finger movement and input information based on finger movement signals sensed by the sensors. The method comprises (a) acquiring sensor signals, which are used to sense movement of the finger device, (b) determining, from the acquired sensor signals, whether at least the predetermined number of edges are detected, and (c) recognizing whether the user is wearing the 3D input device based on the results of step (b).

According to another aspect of the present invention, there is provided a three-dimensional (3D) input device, which is adaptively configurable and performs information input operation using a finger device that is worn by a user and senses the user's finger movement. The 3D input device comprises a pre-processing unit which recognizes whether the user is wearing the finger device and recognizes the finger positions of the finger device and a signal-processing unit which is adaptively configured to process movement signals output from the finger device worn by the user based on the recognition result of the pre-processing unit.

According to another aspect of the present invention, there is provided an apparatus for reconfiguring a three-dimensional (3D) input device which performs information input operation using a finger device that is worn by a user and senses the user's finger movement. The apparatus comprises an application which receives reset information, used for reconfiguration of the 3D information input device, from a user through a user interface and a device driver which is reconfigured based on the reset information received from the application.

According to another aspect of the present invention, there is provided an apparatus for recognizing whether a user is wearing a three-dimensional (3D) information input device, which performs information input operation using a finger device that is worn by the user and senses the user's finger movement. The apparatus comprises a signal acquiring unit which acquires sensor signals indicating movement of the finger device, a port change recognizing unit which determines whether at least the predetermined number of edges are detected from the acquired sensor signals, and a finger device recognizing unit which recognizes whether the user is wearing the finger device, based on the determination result of the port change recognizing unit.

BRIEF DESCRIPTION OF THE DRAWINGS

The above and other features and advantages of the present invention will become more apparent by describing in detail exemplary embodiments thereof with reference to the attached drawings in which:

FIG. 2 is a schematic flowchart of initializing a configuration of the 3D input device of FIG. 1A, according to the present invention;

FIG. 7 is a flowchart illustrating operations in the application of FIG. 6A for reconfiguring the 3D input device of FIG. 1A according to the present invention;

FIG. 15E illustrates the data table obtained after the sensor signal acquisition in FIG. 15A;

FIG. 16D shows the data table obtained after Init_Edge_Status and Time[ ] acquisition in FIG. 16A;

DETAILED DESCRIPTION OF THE INVENTION

The present invention now will be described more fully with reference to the accompanying drawings, in which preferred embodiments of the invention are shown.

Figure 1A:
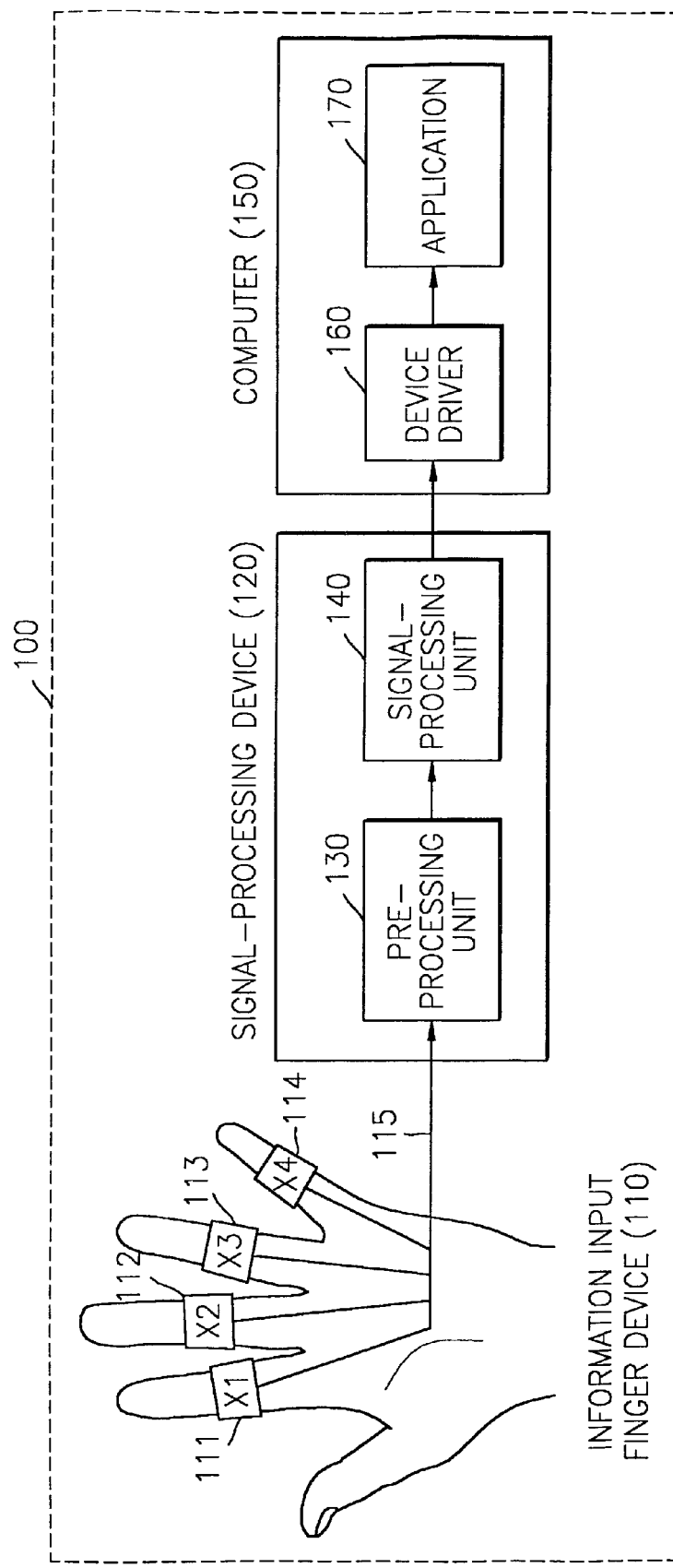
FIG. 1A is a schematic block diagram of a three-dimensional (3D) input device according to the present invention.

FIG. 1A illustrates an example of a three-dimensional (3D) input device 100, according to the present invention.

The 3D input device 100 includes an information input finger device 110 (hereinafter referred to as a finger device), a signal-processing device 120, and a computer 150. FIG. 1 shows the entire configuration necessary for information input. However, hereinafter, the configuration of the 3D input device 100 will be described as it relates to initialization of the 3D input device 100, i.e., the operation of adaptively configuring or reconfiguring the 3D input device 100.

The finger device 110 includes a first sensor (X1) 111, a second sensor (X2) 112, a third sensor (X3) 113, and a fourth sensor (X4) 114, as a sensing means for sensing finger movements. At the base of the finger device 110, there is a connection unit 115 that connects the finger device 110 with a signal-processing device 120.

Figure 1B:
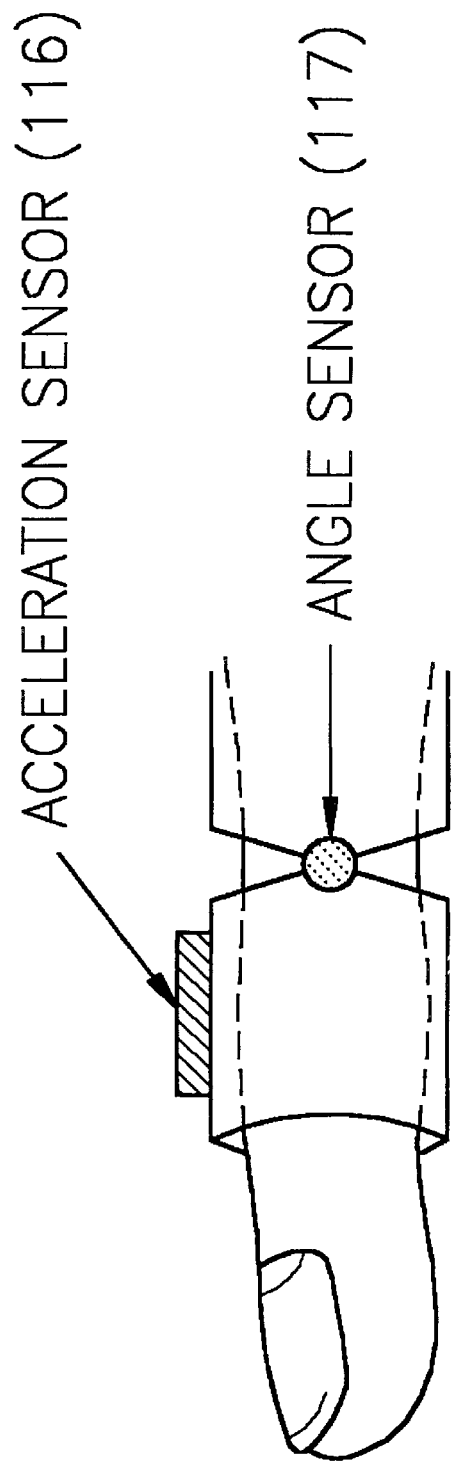
FIG. 1B is a view of a sensing unit attached to the finger device of FIG. 1A.

Each sensor 111, 112, 113, or 114 may include an acceleration sensor 116 and an angle sensor 117 as shown in FIG. 1B. A signal outputted from the acceleration sensor 116, a sensing one on finger movement acceleration, can be used as a clock signal, namely an information input signal. A signal outputted from the angle sensor 117, a sensing one on an angle between the first and second knuckles of a finger, can be used as an information selection signal.

The sensors, however, are not limited to those described above. The present invention may include any other kind of sensors capable of sensing the finger's movement to output signals for information input or information selection. For example, a sensor outputting a digital signal, e.g., an inertial sensor, or a sensor outputting an analog signal, e.g., a potentiometer, a Giant Magnetoresistive (GMR) sensor, an optical sensor, an on/off switch, or a pressure sensor, can be used in the present invention.

The signal-processing device 120 receives and processes a signal outputted from the sensors 111, 112, 113, and 114 of the finger device 110. The signal-processing device 120 may be mounted on the back of a user's hand. The signal-processing device 120 includes a pre-processing unit 130 and a signal-processing unit 140. The pre-processing unit 130 receives the signals outputted from the finger device 110 via the connection unit 115 through a cable or air in a wired or wireless manner, and recognizes the finger device 110 worn by the user. The signal-processing unit 140 receives finger device recognition information outputted from the pre-processing unit 130, self-configures the signal-processing device 120 based on the finger device recognition information, processes finger movement information outputted from the sensors 111, 112, 113, and 114 based on a selected algorithm, extracts movement characteristic information from the finger movement information, and transmits the movement characteristic information to a device driver 160 of the computer 150 through a connection, such as a Universal Serial Bus (USB). Here, self-configuration of the signal-processing unit 140 refers to self-configure the firmware, namely algorithm. For example, if the finger device recognition information is for three fingers, the signal-processing unit 140 self-configures an algorithm in order to process three signals outputted from three sensors.

The computer 150 includes the device driver 160 and the application 170. The device driver 160 configures itself based on basic set-up information and the movement characteristic information received from the signal-processing unit 140 and then reconfigures itself based on reset information received from the application 170. Basic set-up information denotes input scenario information including a language in use or key array of a keyboard, etc. The application 170 receives the basic set-up information and the movement characteristic information from the device driver 160, transmits a soft keyboard to an output device (not shown) based on the received basic set-up information, interprets the received movement characteristic information, and outputs input information items based on the interpreted movement characteristic information to the output device (not shown) or another application (not shown). In addition, the application 170 allows the user to reconfigure the 3D input device 100 through a user interface.

FIG. 2 is a schematic flowchart 200 of initializing a configuration of the 3D input device 100, according to the present invention.

In the first step, S210, a user wears the finger device 110. In step S220, sensor signals are output from the sensors 111, 112, 113, and 114 included in the finger device 110. The pre-processing unit 130 receives sensor signals.

The pre-processing unit 130 recognizes whether the user is wearing the finger device 110 and recognizes the position of the finger device 110, based on the received sensor signals (step S230) and transmits finger device recognition information with finger movement information outputted from the sensors 111, 112, 113, and 114, to the signal-processing unit 140.

The signal-processing unit 140 configures firmware based on the finger device recognition information in step S240, processes the finger movement information, and transmits movement characteristic information to the device driver 160.

The device driver 160 configures itself based on the movement characteristic information and basic set-up information (step S250).

The application 170 outputs a soft keyboard on which positions of fingers are displayed to the output device (not shown) according to the configuration information of the device driver 160 (step S260), interprets the movement characteristic information of the finger device 110, and performs information input procedure (step S270).

Hereafter, each element of FIG. 1A and an operation of initialization of configuration will be described with reference to FIGS. 3A through 9.

Figure 3A:
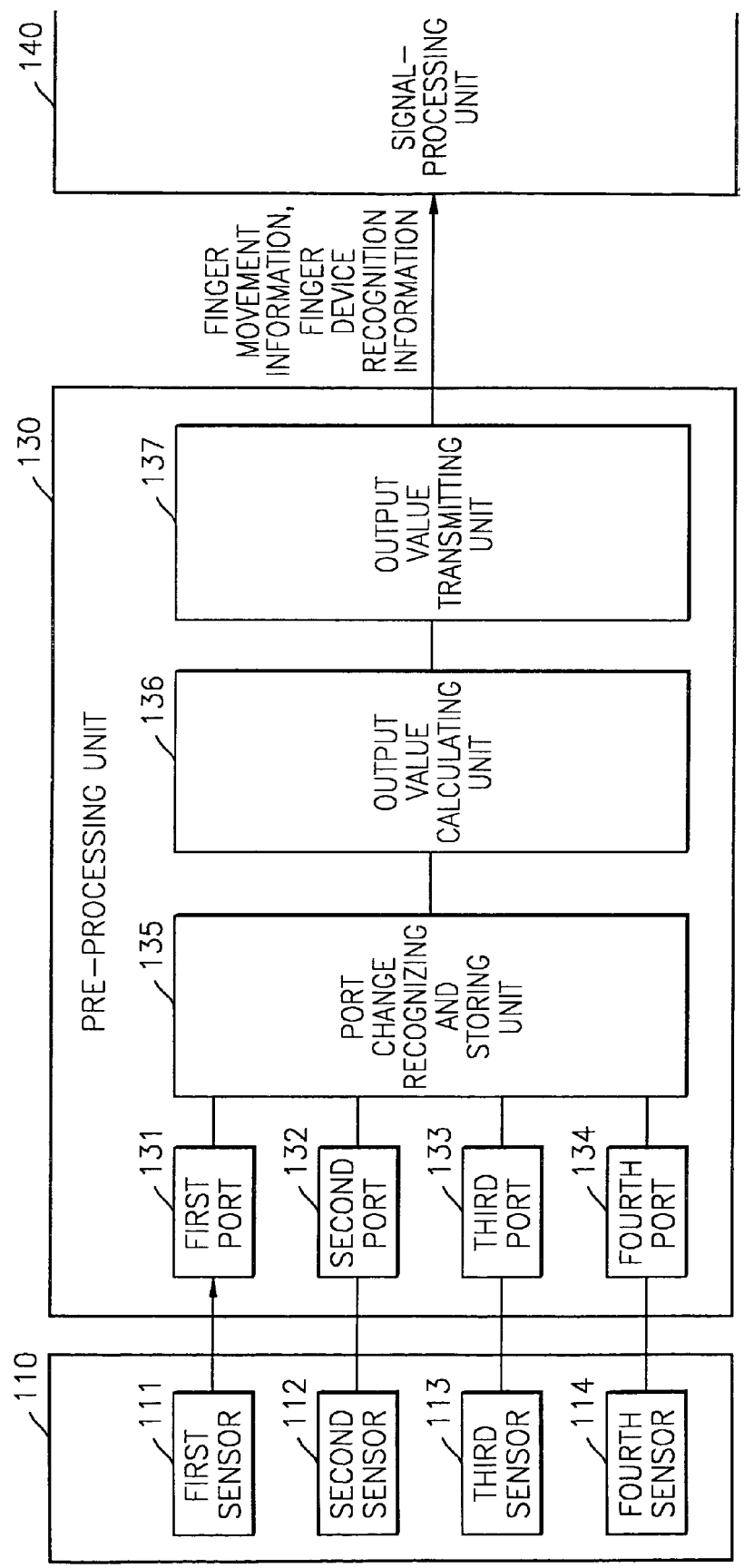
FIG. 3A is a detailed block diagram of the pre-processing unit of FIG. 1A.
Figure 3B:
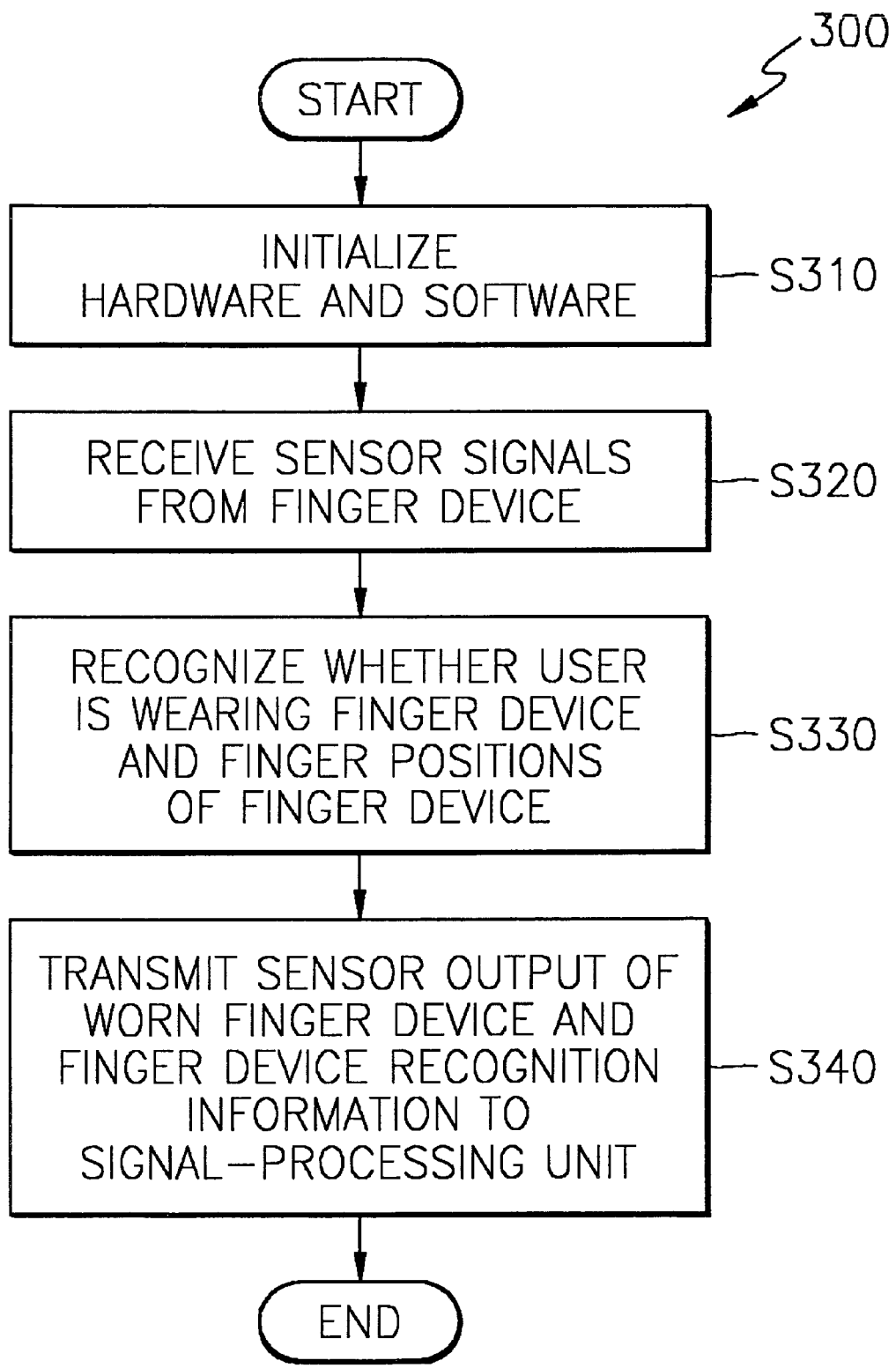
FIG. 3B is a flowchart illustrating operations in the pre-processing unit of FIG. 3A for initializing configuration of the 3D input device of FIG. 1A, according to the present invention.

FIG. 3A is a detailed block diagram of the pre-processing unit 130 of FIG. 1A, and FIG. 3B is a flowchart of initialization operations in the pre-processing unit 130 of FIG. 3A for configuration of the 3D input device, according to the present invention. With reference to FIGS. 3A and 3B, configuration and operation of the pre-processing unit 130 will be described.

The pre-processing unit 130 of FIG. 3A includes a first port 131, a second port 132, a third port 133, and a fourth port 134 that receive sensing information from the finger device 110, a port change recognizing and storing unit 135 that recognizes changes between previous and current times in each port, an output value calculating unit 136 that calculates output values using values stored in the port change recognizing and storing unit 135, and an output value transmitting unit 137 that transmits the calculated outputs to the signal-processing unit 140.

The pre-processing unit 130 initializes hardware and software therein (step S310).

After that, the pre-processing unit 130 receives the sensor signals from the first sensor 111, the second sensor 112, the third sensor 113, and the fourth sensor 114 of the finger device 110 (step S320). The first port 131, the second port 132, the third port 133, and the fourth port 134, respectively, detect the sensor signals. The sensor signals include signals for information item selections and signals for the information input. The information item selection denotes selecting an information item among a plurality of information items, for example, selecting a character key among a plurality of character keys. The information input denotes clicking the selected character key.

In step S330, it is recognized whether the user is wearing the finger device 110 and the finger positions of the finger device 110 using the received sensor signals. The sensor signals used to recognize the finger device 110 may be the signals for the information item selections or the signals for the information input. However, hereinafter, the sensor signals means the information input signals output from the acceleration sensor 116. In addition, the finger device recognition information refers to which sensor information about sensor usage and finger position. Step S330 may be performed by the port change recognizing and storing unit 135 and the output calculating unit 136, which will be described in detail later.

Next, the output transmitting unit 137 transmits the finger device recognition information and sensor signals to the signal processing unit 140 (step S340). The finger device recognition information denotes information recognized by the pre-processing unit 130, and the sensor output signals denote the finger movement information of the finger device 110.

Figure 4A:
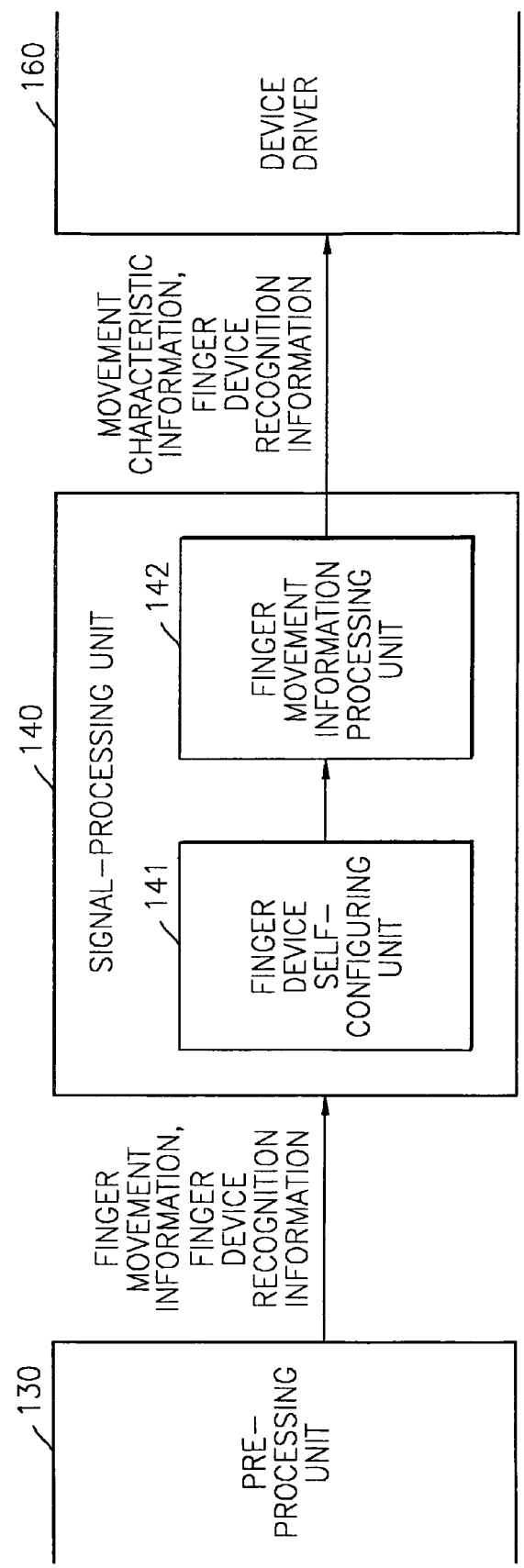
FIG. 4A is a detailed block diagram of the signal-processing unit of FIG. 1A.
Figure 4B:
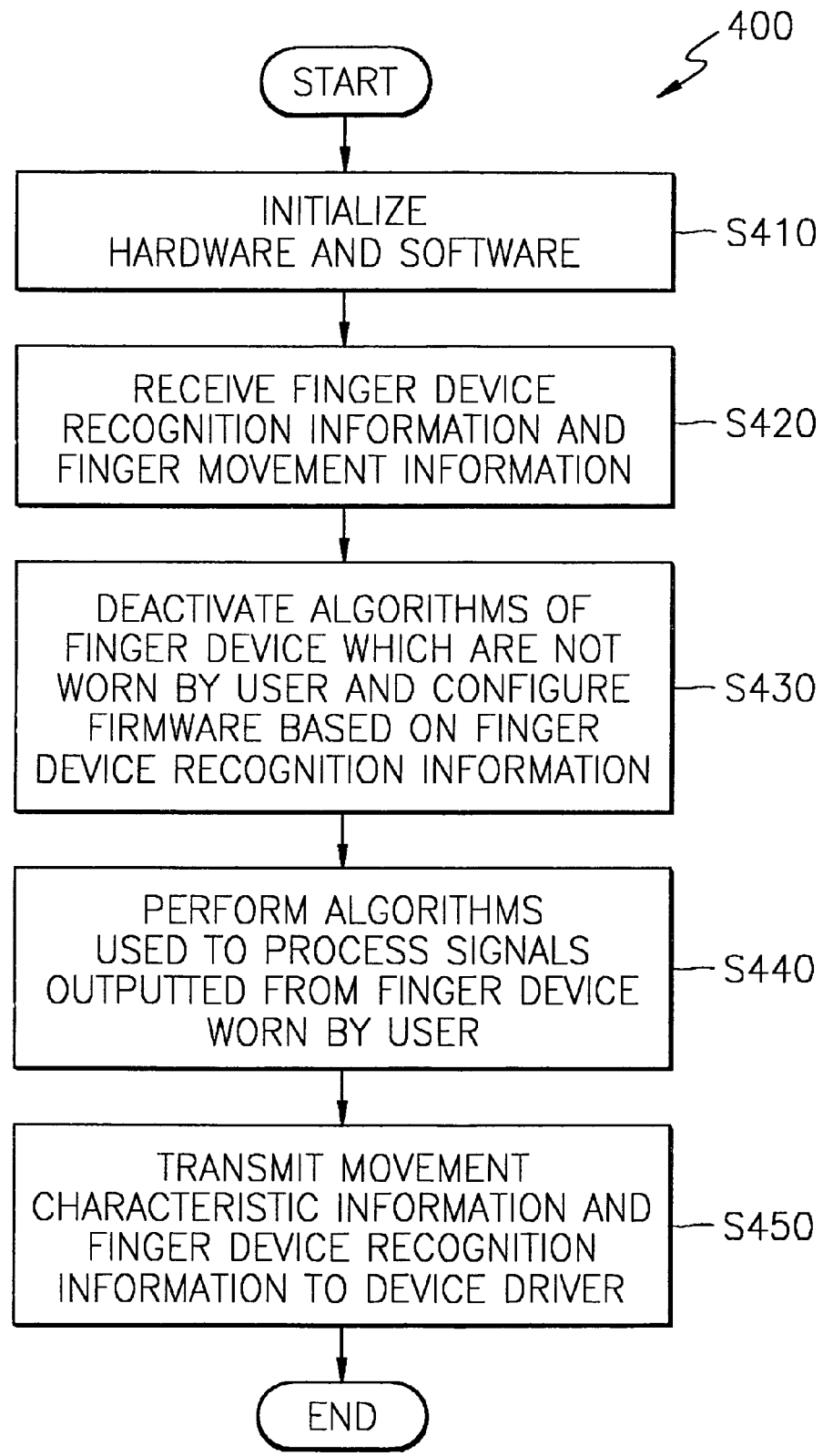
FIG. 4B is a flowchart illustrating operations in the signal-processing unit of FIG. 4A for initializing configuration of the 3D input device of FIG. 1A, according to the present invention.

FIG. 4A is a detailed block diagram of the signal-processing unit 140 of FIG. 1A, and FIG. 4B is a flowchart of operations in the signal-processing unit 140 of FIG. 4A for initializing configuration of the 3D information input device, according to the present invention. With reference to FIGS. 4A and 4B, configuration and operation of the signal-processing unit 140 of the signal-processing device 120 will be described.

The signal-processing device 140 of FIG. 4A includes a finger device self-configuring unit 141 and a finger movement information processing unit 142. The finger device self-configuring unit 141 receives the finger movement information and the finger device recognition information from the pre-processing unit 130, and self-configures the finger device 110 based on the received finger device recognition information. The finger movement information processing unit 142 extracts movement characteristic information by processing the received finger movement information based on an algorithm of the self-configured finger device 110.

Hereinafter, the operation of the signal-processing unit 140 will be described with reference to FIG. 4B.

The signal-processing unit 140 initializes its hardware and software in step S410. After the finger device self-configuring unit 141 receives the finger device recognition information and the sensor signals from the pre-processing unit 130 (step S420), the finger device self-configuring unit 141 deactivates algorithms on the unworn sensors and configures the firmware subsequently based on the received finger device-recognition information (step S430). For example, if the finger device self-configuring unit 141 receives finger device recognition information indicating the user is wearing the second 112, third 113, and fourth 114 sensors, the finger device self-configuring unit 141 sets up algorithms used to process the signals received from the second 112, third 113, and fourth 114 sensors and deactivates the other algorithms.

In step S440, the finger movement information processing unit 142 executes the signal processing algorithms on the signals output from the worn sensors based on the configured firmware. That is, the finger movement information processing unit 142 inputs the received sensor signals to the algorithms on the second 112, third 113 and fourth 114 sensors, calculates the selection information obtained by the operation of the finger device 110, and determines whether operations of the finger device 110 correspond to information input. For example, the finger movement information processing unit 142 calculates the positions of fingers to determine which information items are selected by the corresponding fingers, determines keys which correspond to the calculated positions of fingers, or determines whether the operations of the finger device 110 correspond to information input by evaluating whether signal values for the information input have crossed a predetermined threshold. The calculation results of the selection information and determination results to input operations become the movement characteristic information.

After that, the finger movement information processing unit 142 transmits the movement characteristic information, and the previously received finger device recognition information to the device driver 160 of the computer 150 in step S450. The signal-processing unit 140 may use USB to transmit the movement characteristic information to the device driver 160 of the computer 150.

Figure 5A:
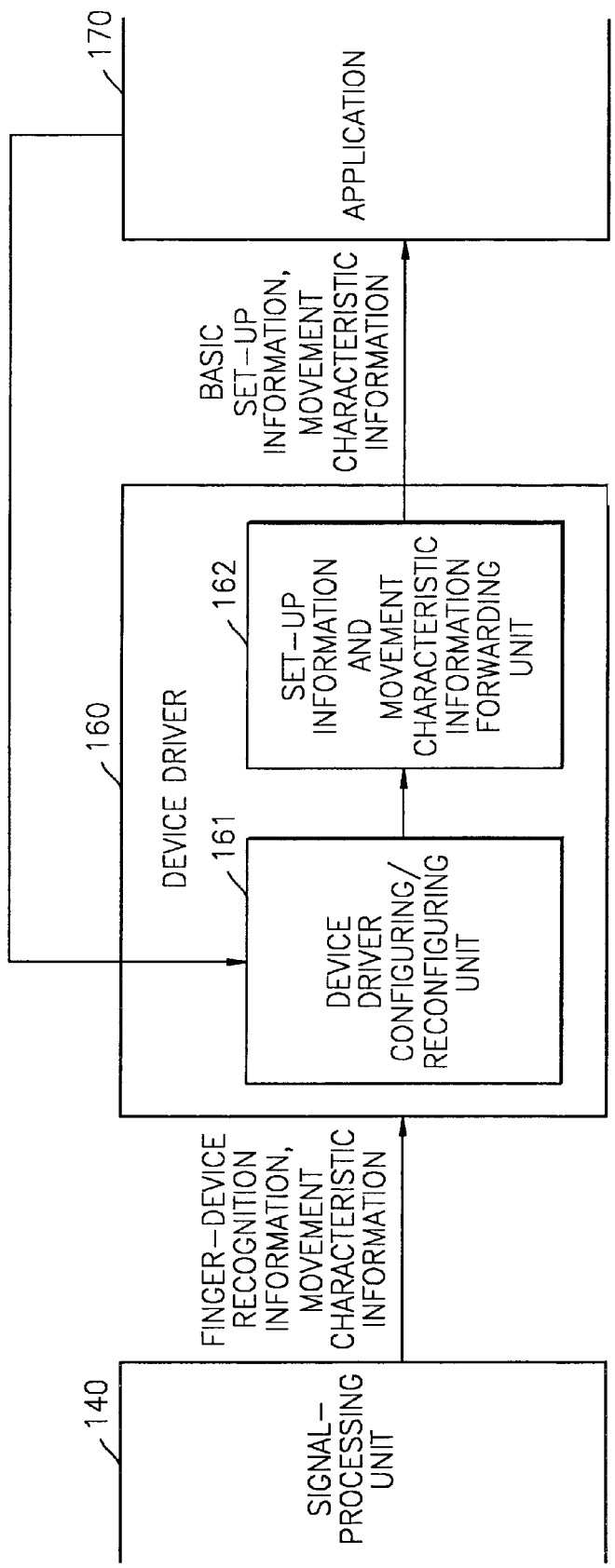
FIG. 5A is a detailed block diagram of the device driver of FIG. 1A.
Figure 5B:
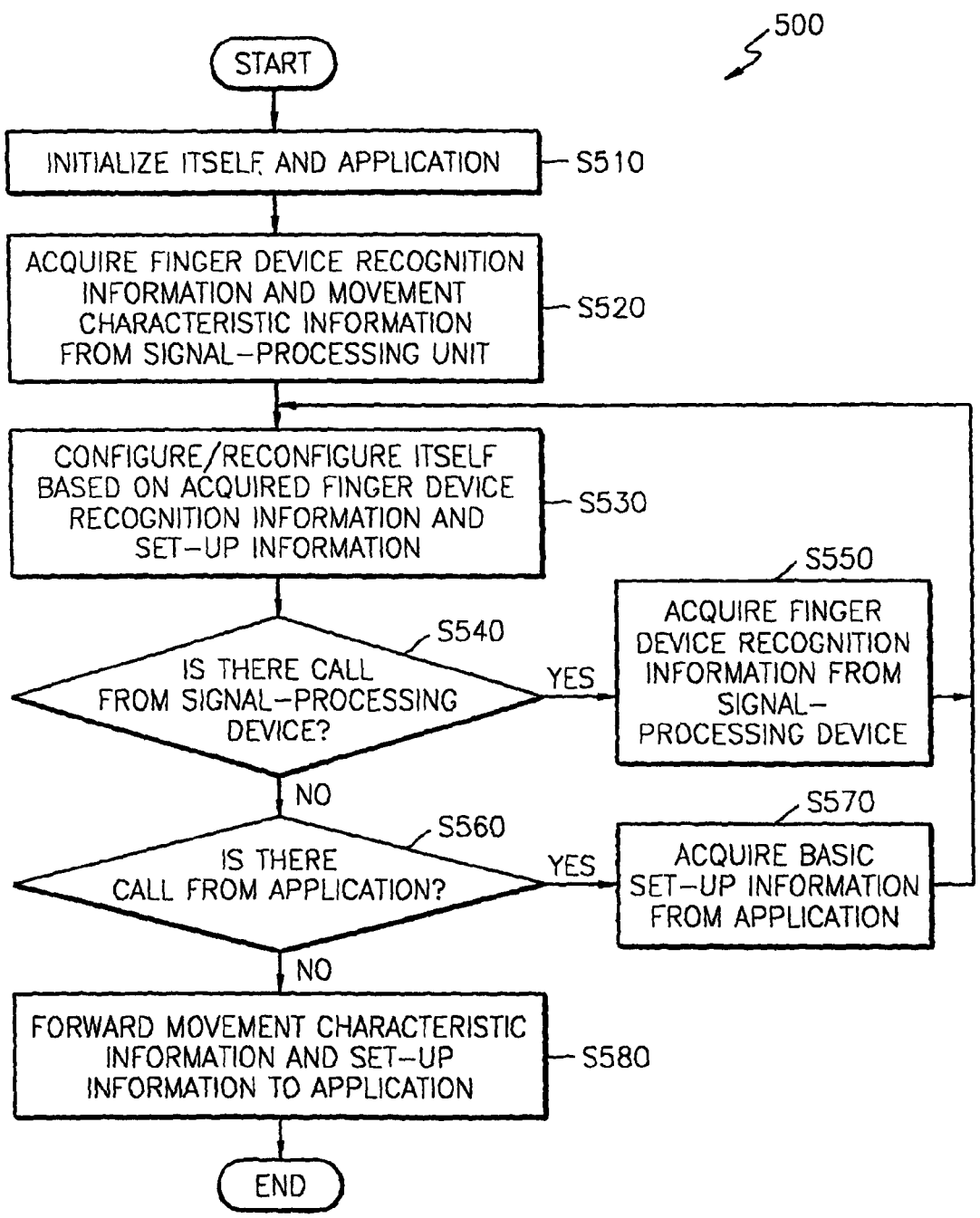
FIG. 5B is a flowchart illustrating operations in the device driver of FIG. 5A for initializing configuration of the 3D input device of FIG. 1A according to the present invention.

FIG. 5A is a detailed block diagram of the device driver 160 of FIG. 1A, and FIG. 5B is a flowchart of operations in the device driver 160 of FIG. 5A for initializing the configuration of the 3D input device 100, according to the present invention. With reference to FIGS. 5A and 5B, configuration and operation of the device driver 160 of the computer 150 will be described.

The device driver 160 of FIG. 5A includes a device driver self-configuring/reconfiguring unit 161 and a set-up information and movement characteristic information forwarding unit 162. The device driver self-configuring/reconfiguring unit 161 receives the finger device recognition information and the movement characteristic information from the signal-processing unit 140 and configures the device driver 160 based on the received finger device recognition information and basic set-up information. The set-up information and movement characteristic information forwarding unit 162 forwards the set-up information set by the device driver configuring/reconfiguring unit 161, and the movement characteristic information received from the signal-processing unit 140 to the application 170.

Hereinafter, the operation of the device driver 160 will be described with reference to FIG. 5B.

In the first step S510, the device driver 160 initializes itself and the application 170.

Next, the device driver configuring/reconfiguring unit 161 receives the finger device recognition information and the movement characteristic information from the signal-processing unit 140 (step S520). In step S530, the device driver configuring/reconfiguring unit 161 configures the device driver 160 based on the received finger device recognition information. Here, preset default values are used for other selection information excluding the received finger device recognition information. The other selection information refers to, for example, input scenario information related to a kind of keyboard or a language used for information input.

If there is a call from the signal-processing device 120 (step S540), the device driver self-configuring/reconfiguring unit 161 acquires the finger device recognition information from the signal-processing device 120 (step S550) and reconfigures the device driver 160 based on the acquired finger device recognition information. For example, if a user is wearing four sensors on four fingers and takes one of them off, the device driver configuring/reconfiguring unit 161 receives new finger device recognition information from the signal-processing device 120 and reconfigures the device driver 160 based on the received finger device recognition information.

If it receives a call from the application 170 in step S560, the device driver configuring/reconfiguring unit 161 acquires the basic set-up information from the application 170 (step S570) and reconfigures the device driver 160 based on the acquired set-up information. At first, the device driver configuring/reconfiguring unit 161 configures the device driver 160 by default values for the input scenario and user language. After that, the user can change the input scenario or the user language through a user interface (not shown) provided by the application 170. In this case, the device driver configuring/reconfiguring unit 161 acquires the set-up information from the application 170 to self-configure the device driver 160.

In step S580, the set-up information and movement characteristic information forwarding unit 162 forwards the received movement characteristic information and set-up information to the application 170.

Figure 6A:
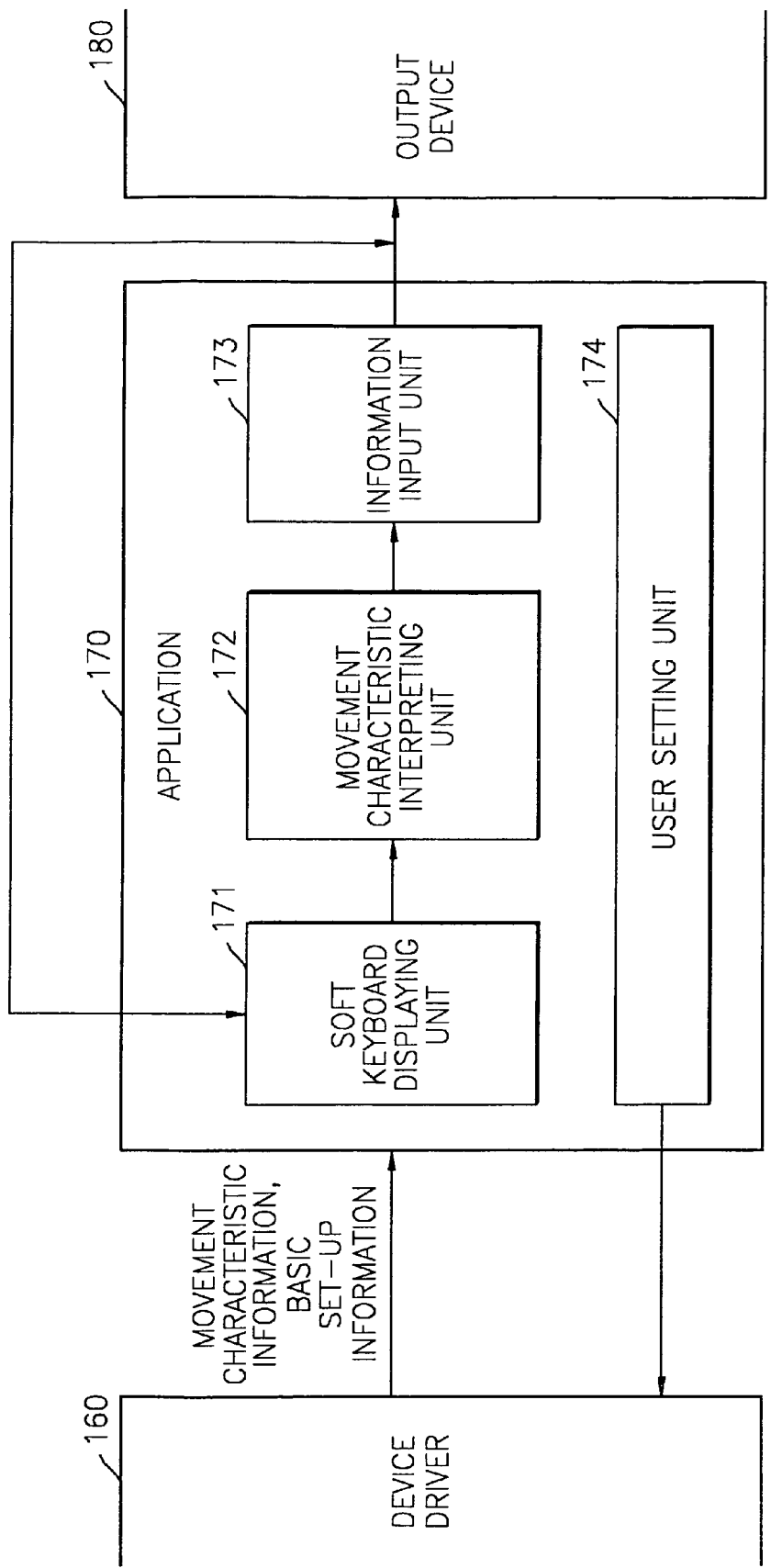
FIG. 6A is a detailed block diagram of the application of FIG. 1A.
Figure 6B:
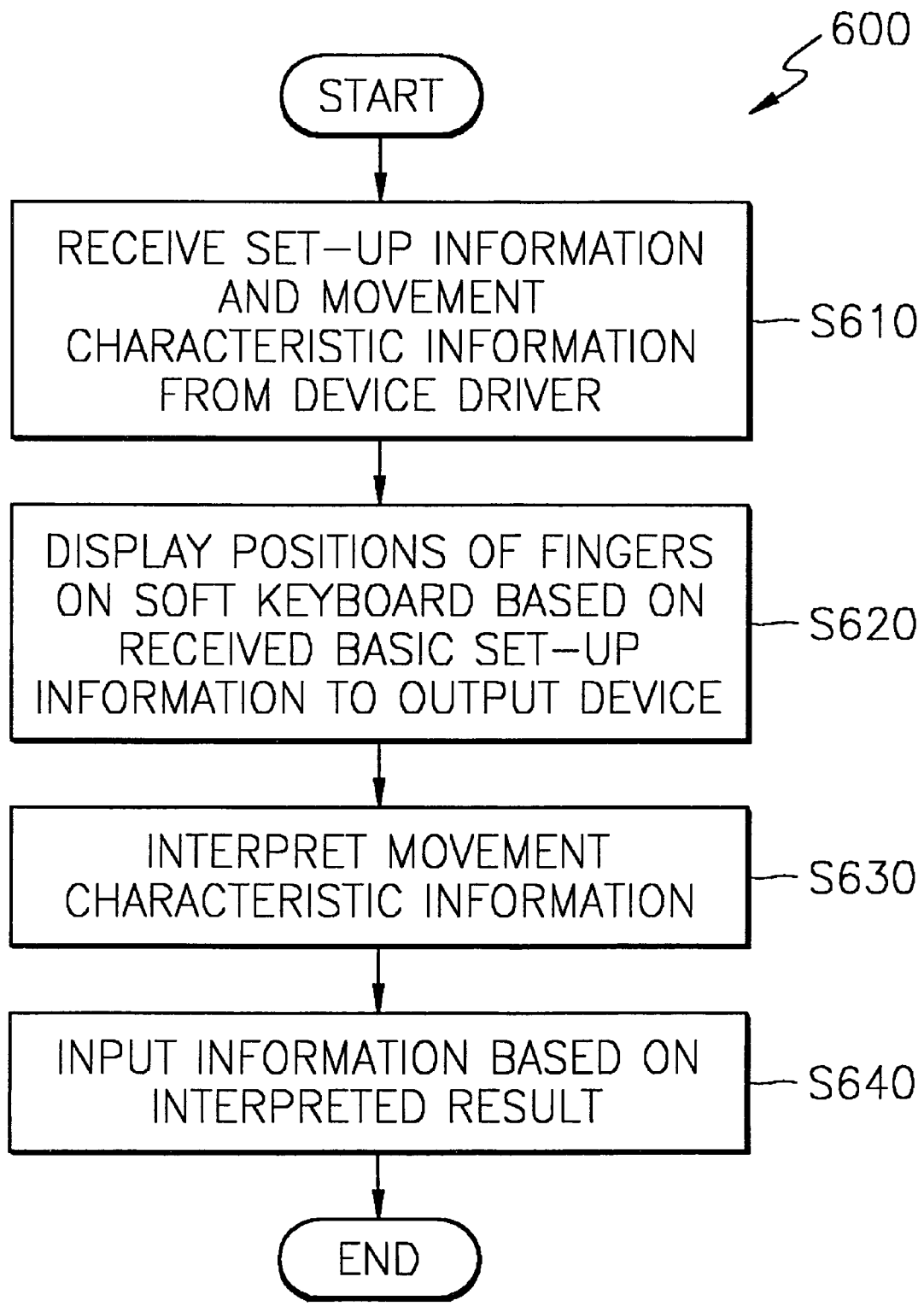
FIG. 6B is a flowchart illustrating operations of the application of FIG. 6A for initializing of the configuration of the 3D input device of FIG. 1A, according to the present invention.

FIG. 6A is a detailed block diagram of the application 170 of FIG. 1A, and FIG. 6B is a flowchart of operations in the application 170 of FIG. 6A for initializing configuration of the 3D input device, according to the present invention. With reference to FIGS. 6A and 6B, configuration and operation of the application 170 will be described.

The application 170 of FIG. 6A includes a soft keyboard displaying unit 171, which receives the movement characteristic information and the set-up information from the device driver 160, and displays the soft keyboard on an output device 180; a movement characteristic information interpreting unit 172, which interprets the received movement characteristic information; an information input unit 173, which inputs information based on the interpreted movement characteristic information; and a user setting unit 174 which allows a user to reconfigure the 3D input device of FIG. 1A.

Hereinafter, the operations in the application 170 will be described with reference to FIG. 6B.

The soft keyboard displaying unit 171 receives the movement characteristic information and the set-up information from the device driver 160 (step S610).

Figure 8:
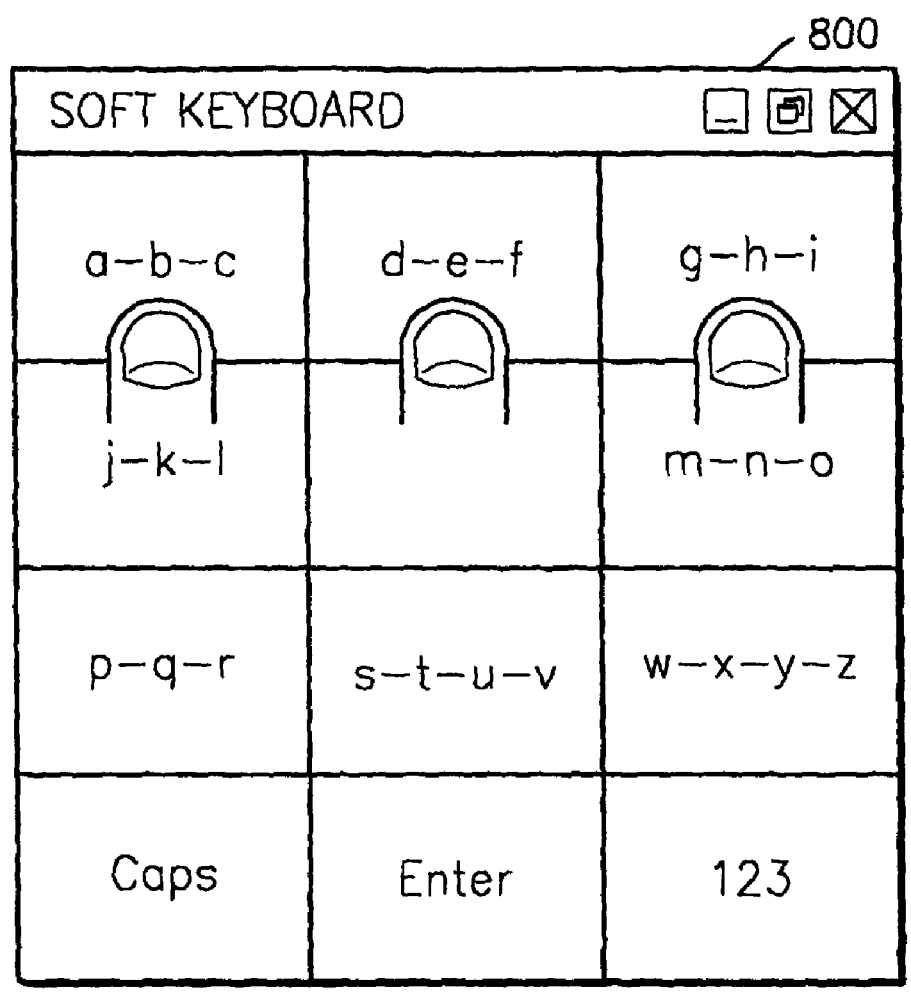
FIG. 8 is an exemplary view of a soft keyboard which is outputted from the application of FIG. 6A to an output unit.

In step S620, the soft keyboard displaying unit 171 displays finger positions on a soft keyboard displaying finger positions based on the received set-up information and transmits the soft keyboard to the output device 180 (step S620). FIG. 8 shows an example of the soft keyboard displayed on the output device 180. As shown in FIG. 8, an adopted language is English and the input scenario is a cellular phone-type. It is also known that three sensors are connected.

The movement characteristic information interpreting unit 172 interprets the received movement characteristic information in step S630. As described previously, the movement characteristic information includes the calculation results of the selection information and the determination results of whether there is any input operation. The movement characteristic interpreting unit 172 interprets the calculation results and determines the keys which correspond to the selected information. In addition, the movement characteristic interpreting unit 172 interprets the determination results of whether there is any input operation and decides whether to process the determination results as an information input.

Next, the information input unit 173 accepts information corresponding to the interpreted results of the movement characteristic information interpreting unit 172 in step S640.

FIG. 7 is a flowchart 700 of operations in the application 170 of FIG. 6A for reconfiguration of the 3D input device of FIG. 1A, according to the present invention. Reconfiguration of the 3D information input device can be performed by the user setting unit 174 of the application 170.

In the first step S710, the application 170 receives a user request for manual setting of the 3D input device 110. The manual setting can be performed by the user using the user interface shown in FIG. 9. The user interface may be included in a control board 900 provided by Microsoft Windows in a form of keyboard registration information 910 as general keyboard registration information.

Figure 9:
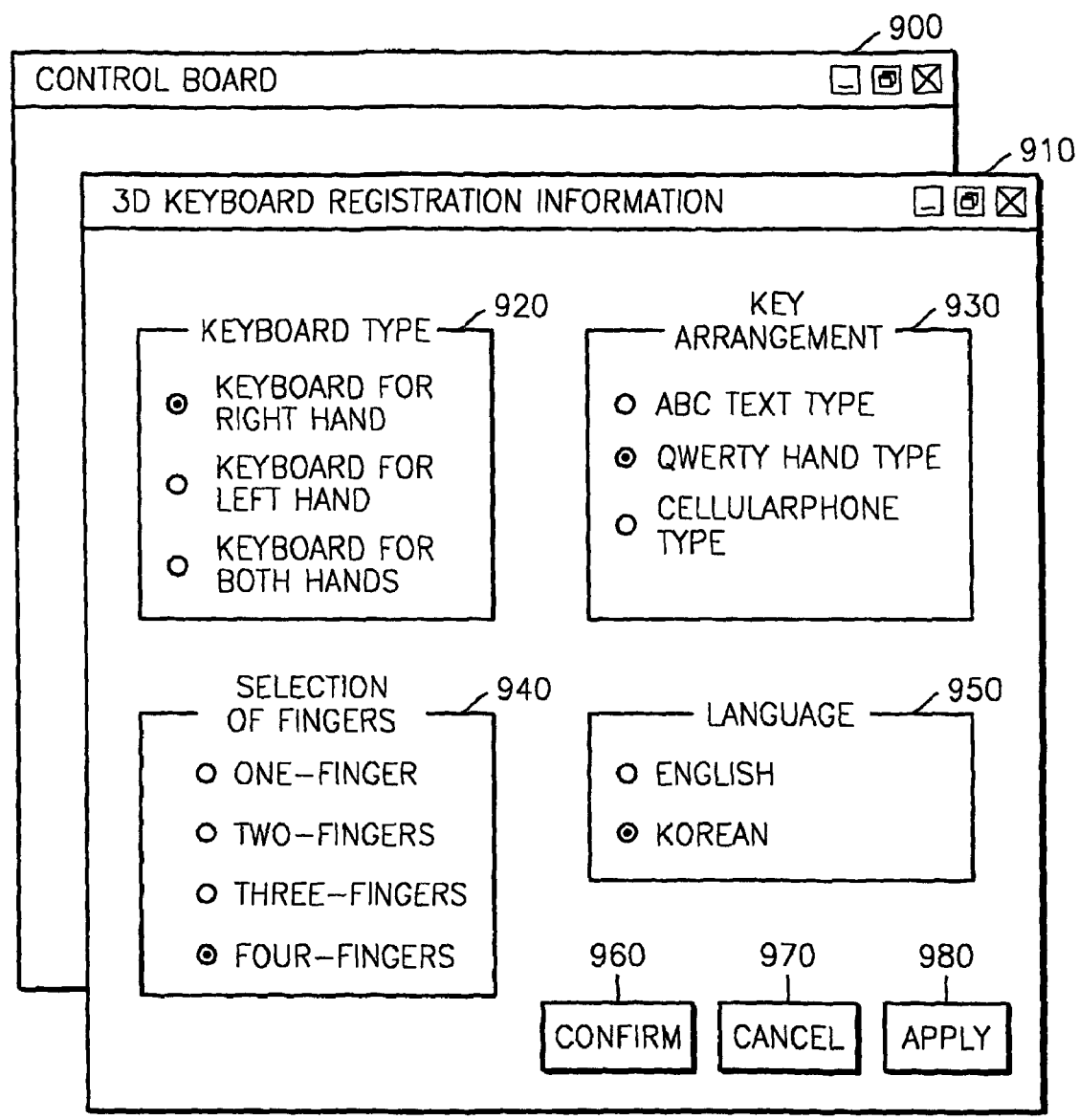
FIG. 9 is an exemplary view of the user interface for reconfiguring the 3D input device of FIG. 1A in the application of FIG. 6A.

The user requests a setting change permission or cancel of use on a specific sensor (step S720), selects an input scenario in step S730, or selecting a user language in a manual setting menu (step S740). As shown in FIG. 9, the user interface allows the user to select keyboard type, key arrays, fingers to use, and the user language.

When the application 170 receives such requests of changes, it transmits the set-up information to the device driver 160 (step S750), and then the device driver 160 reconfigures itself based on the received set-up information (step S760).

Components and their operations for initializing a 3D input device, especially recognizing a finger device and configuring the 3D input device based on finger device recognition information, are described hitherto. Hereinafter, detailed operations of the pre-processing unit 130, which recognizes the finger device 110, will be described.

Figure 10:
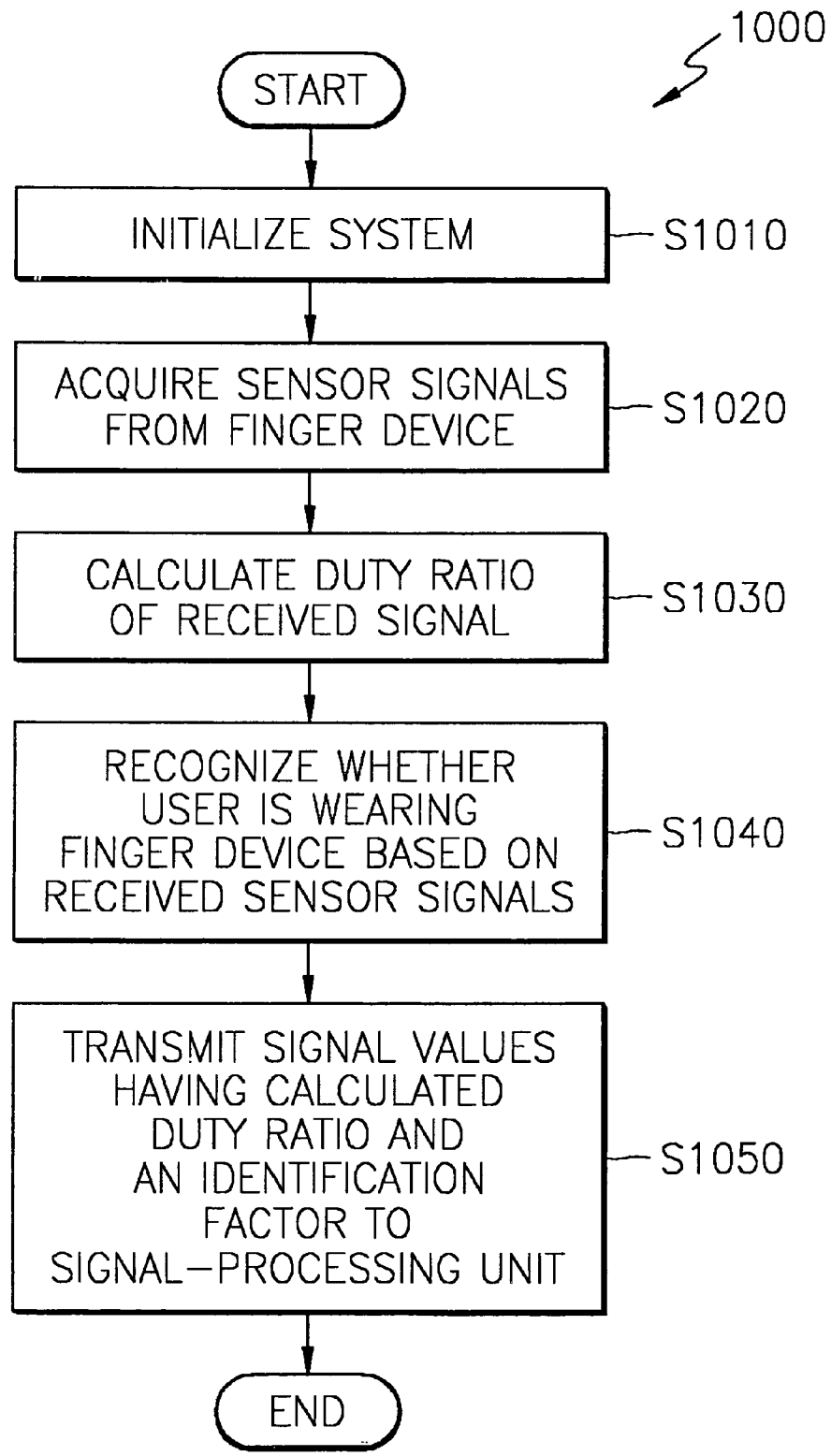
FIG. 10 is a detailed flowchart of operations in the pre-processing unit of FIG. 1A.

FIG. 10 is a schematic flowchart 1000 of operations in the pre-processing unit 130 of FIG. 1A.

The pre-processing unit 130 initializes a system (step S1010) and acquires sensor signals from the finger device 110 (step S1020). The operations for receiving the sensor signals will be described in detail with reference to FIG. 11.

The pre-processing unit 130 calculates a duty ratio of the received signal (step S1030), and then recognizes whether a user is wearing the finger device based on the received sensor signals (step S1040). The operations for calculating the duty ratio and recognizing whether the user is wearing the finger device will be described in detail with reference to FIG. 12.

The pre-processing unit 130 transmits signal values having the calculated duty ratio and an identification factor in which the finger device recognition information is stored to the signal-processing unit 140 (step S1050). The operations for transmitting the signal values and the identification factor to the signal-processing unit 140 will be described in detail with reference to FIG. 13.

Figure 11:
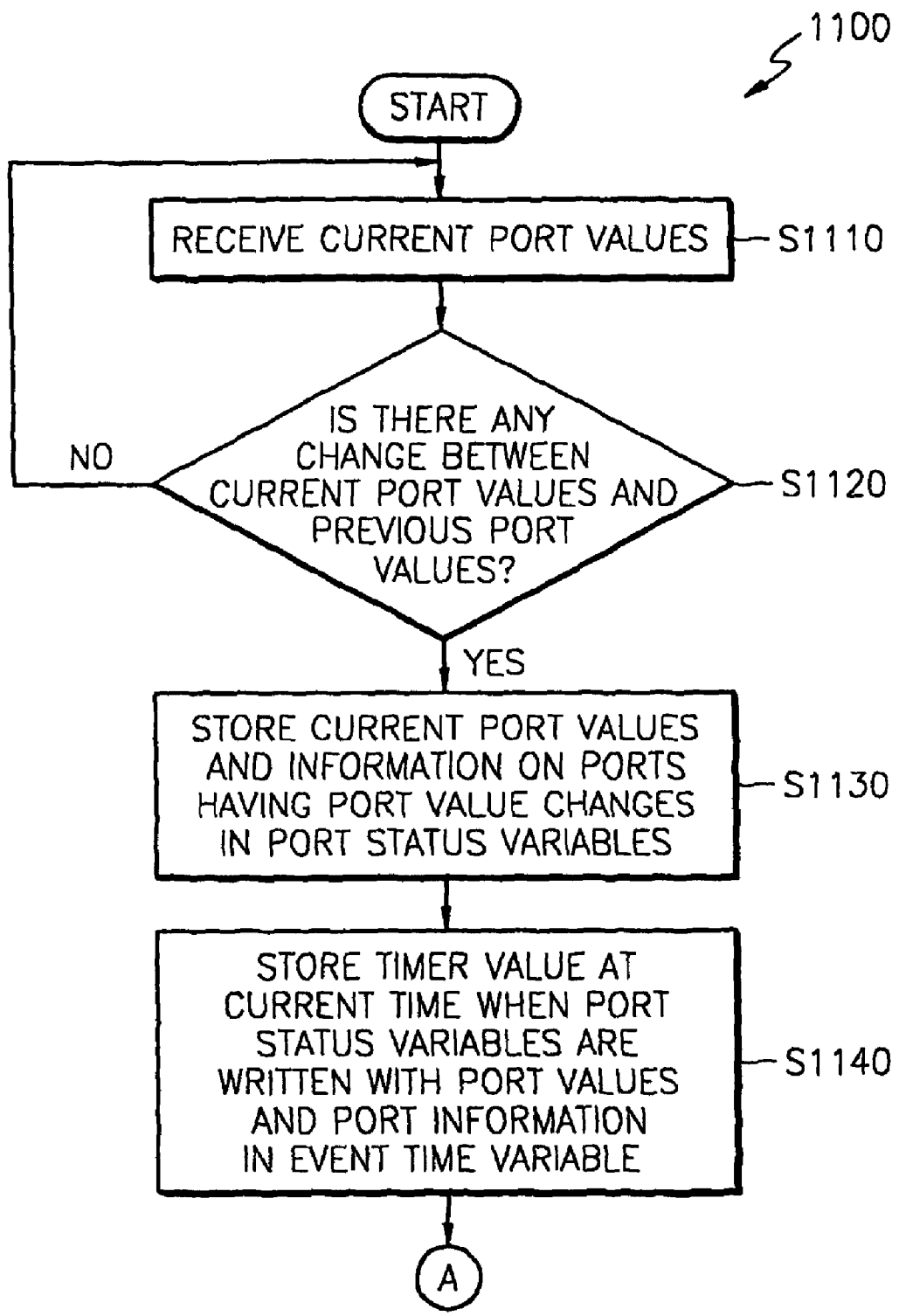
FIG. 11 is a detailed flowchart of a sensor signal acquisition step in FIG. 10.

Hereinafter, the operation of acquiring the sensor signals from the finger device 110 will be described in detail with reference to FIG. 11. The number of ports may be as many as the number of the sensor signals. In this description, each point value may be used as each sensor signal which passes corresponding port through.

The pre-processing unit 130 receives current port values outputted from sensors 111, 112, 113, and 114 of the finger device 110 (step S1110). The current port values are stored as previous port values after a predetermined amount of time.

Next, the pre-processing unit 130 determines whether there is any change between the current port values and the previous port values (step S1120). A change in a port value means that an edge is triggered in a signal which passes the corresponding port through.

Next, the pre-processing unit 130 stores the current port values and information on the ports having port value changes in port status variables (step S1130).

The pre-processing unit 130 stores a timer value at a current time when the port status variables are written with the port values and port information in an event time variable (step S1140). Namely, the current timer value indicates a time when the edge is triggered.

Figure 12:
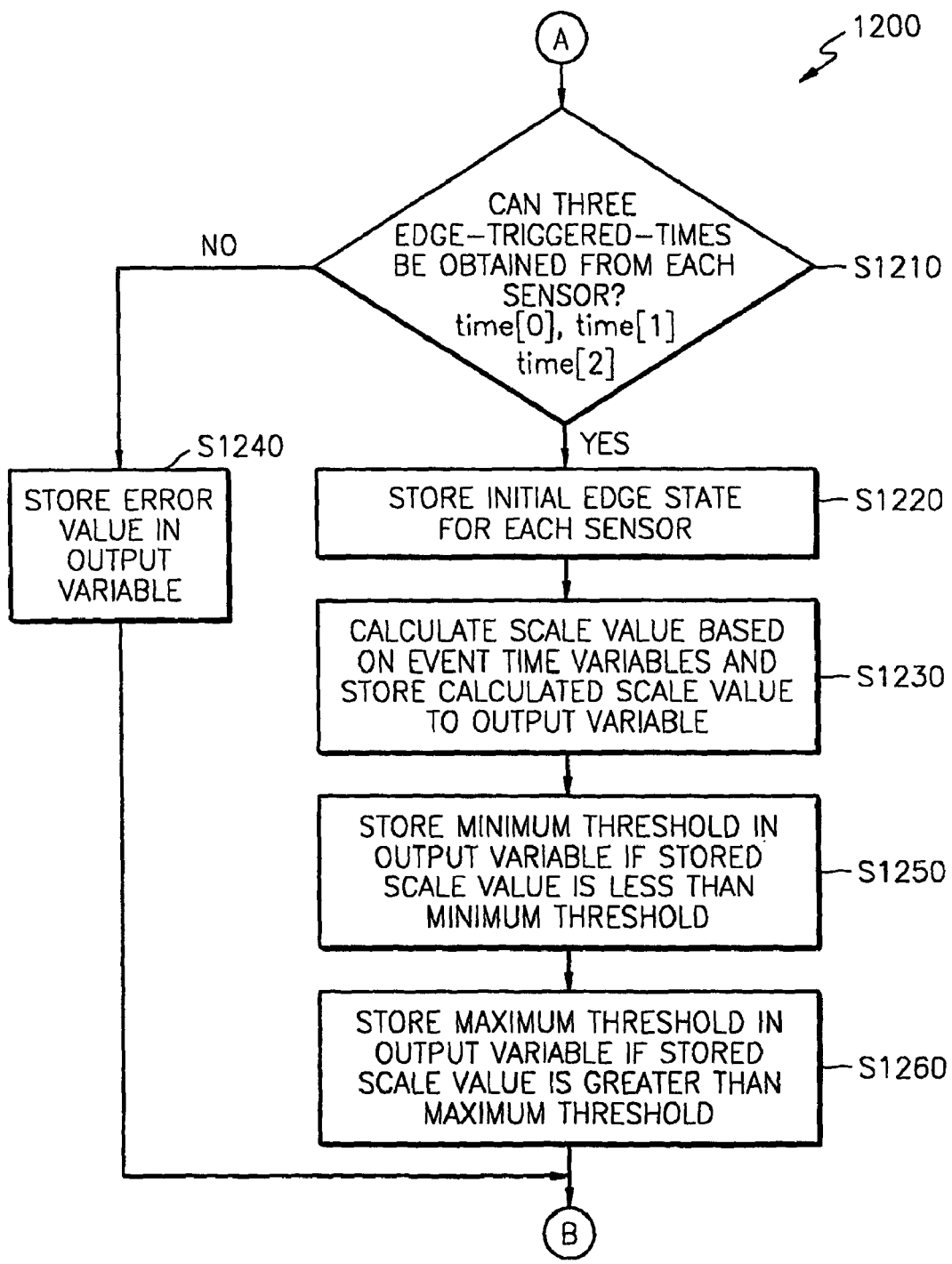
FIG. 12 is a detailed flowchart of a step of calculating a duty ratio and recognizing whether a user wears the finger elements in FIG. 10.

FIG. 12 is a detail flowchart of steps 1030 and 1040 of FIG. 10.

In the first step S1210, the pre-processing unit 130 determines whether three edge-triggered-times can be obtained from each sensor. The edge-triggered-time is stored in the event time variable. When three event time variables for each sensor are obtained, the three event time variables are stored in time[0], time[1], and time[2].

If the three edge-triggered-times cannot be extracted from each sensor, an error value is stored in an output variable (step S1240). In detail, the fact that the three edge-triggered-times cannot be extracted means that the edge is triggered less than three times for a predetermined-time-period. This indicates the sensor is not operating normally. Consequently, the error value is written to the output variable.

If the three edge-triggered-times can be extracted, the pre-processing unit 130 stores the initial edge state for each sensor (step S1220).

In step S1230, the pre-processing unit 130 calculates a scale value based on the event time variables and stores the calculated scale value to the output variable.

In step S1250, the pre-processing unit 130 stores a minimum threshold in the output variable if the stored scale value is less than the minimum threshold. In step S1260, the pre-processing unit 130 stores a maximum threshold in the output variable if the stored scale value is greater than the maximum threshold.

Figure 13:
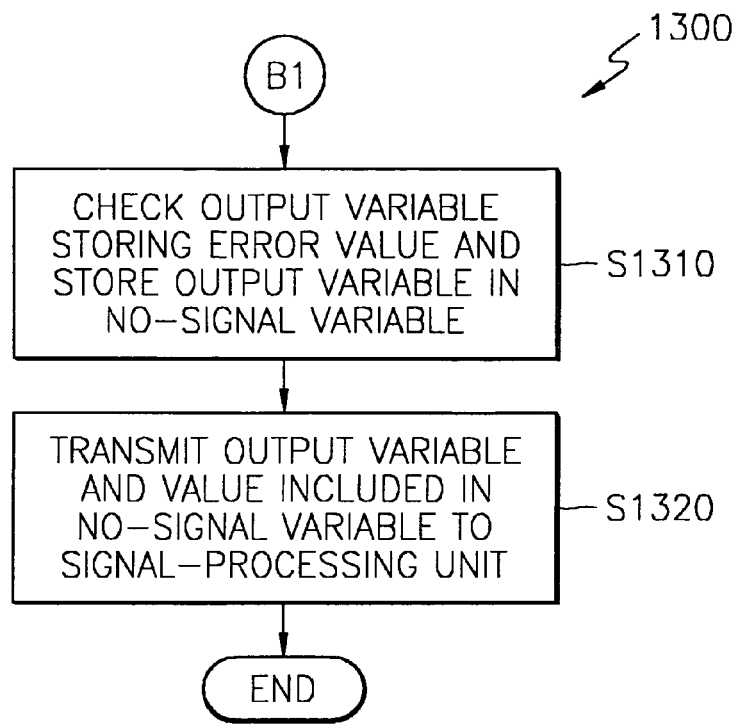
FIG. 13 is a detailed flowchart of a step of transmitting signal values of FIG. 10.

FIG. 13 is a detail flowchart of step 1050 of FIG. 10.

In the first step S1310, the pre-processing unit 130 checks the output variable having the error value, and stores the value in a no-signal variable. The no-signal variable includes information indicating a sensor is not normally outputting a sensor signal.

In step S1320, the pre-processing unit 130 transmits the output variable and the value included in the no-signal variable to the signal-processing unit 140.

FIGS. 14 through 20 show a detailed algorithm used in the pre-processing unit 130 to recognize whether a user is wearing a finger device and to recognize the finger positions of the finger device.

Figure 14:
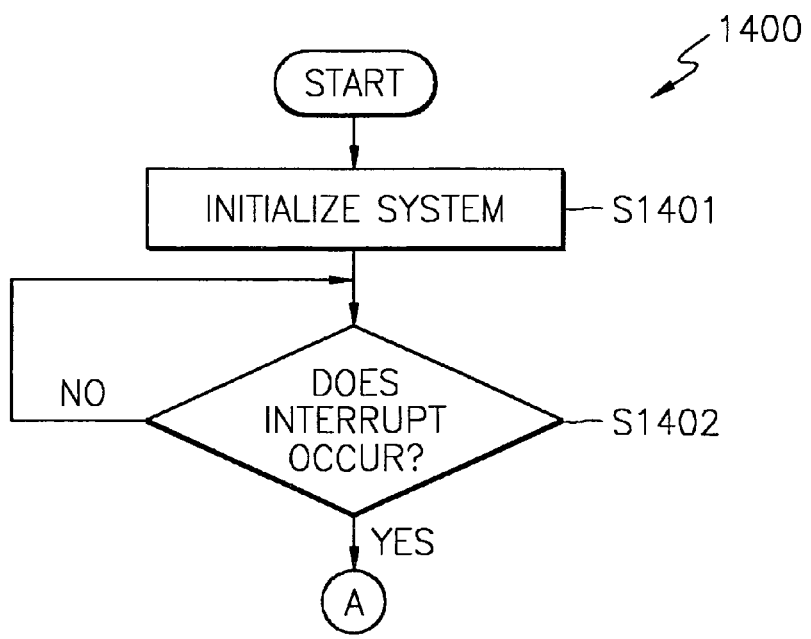
FIG. 14 is a detailed flowchart of early steps of an algorithm of a pre-processing procedure of FIG. 10.

Referring to FIG. 14, the pre-processing unit 130 initializes the system (step S1401) and proceeds to 'A' if an interrupt occurs in step S1402.

Figure 15A:
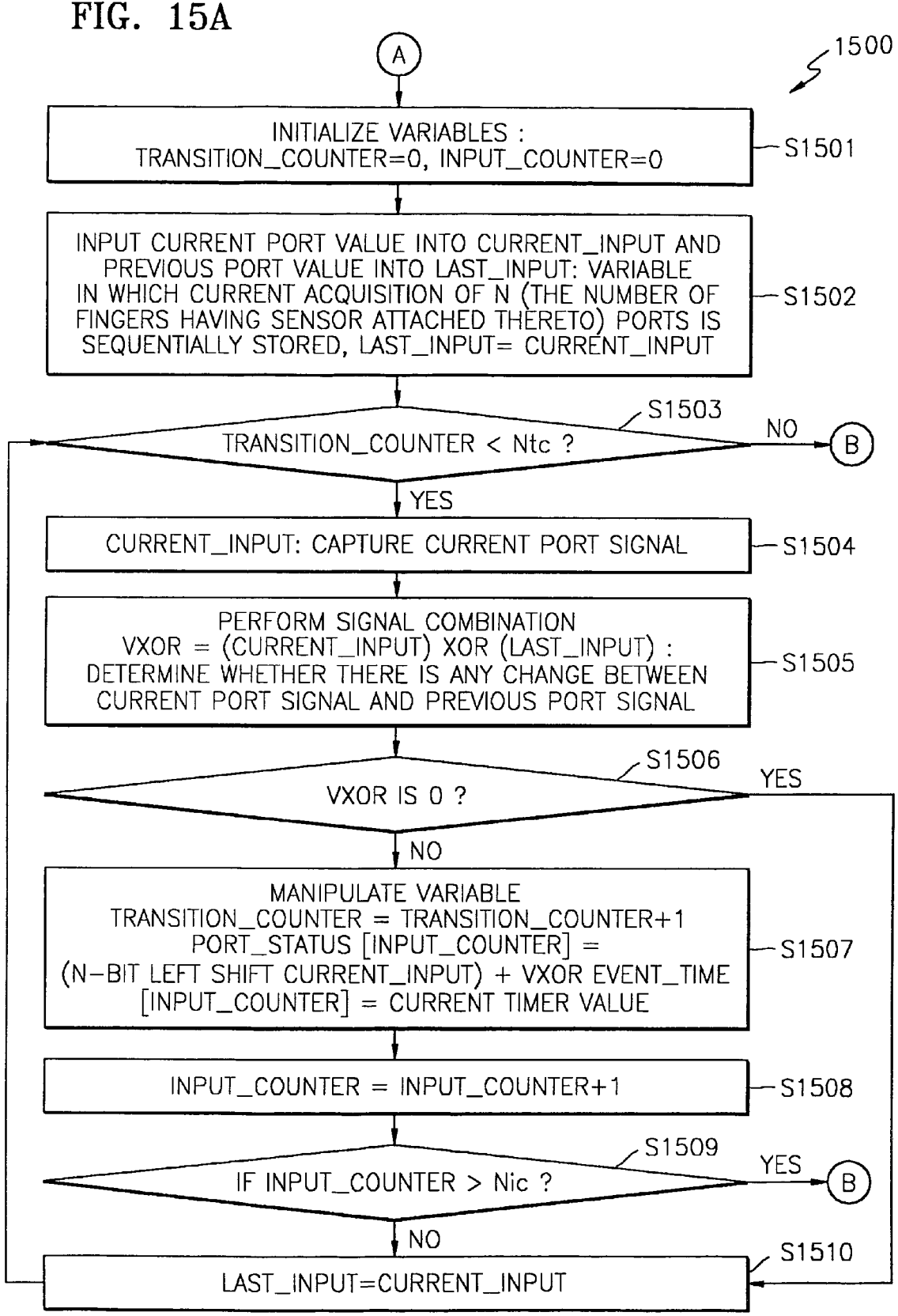
FIG. 15A is a detail flowchart of an algorithm for acquiring the sensor signals of FIG. 11.
Figure 15B:
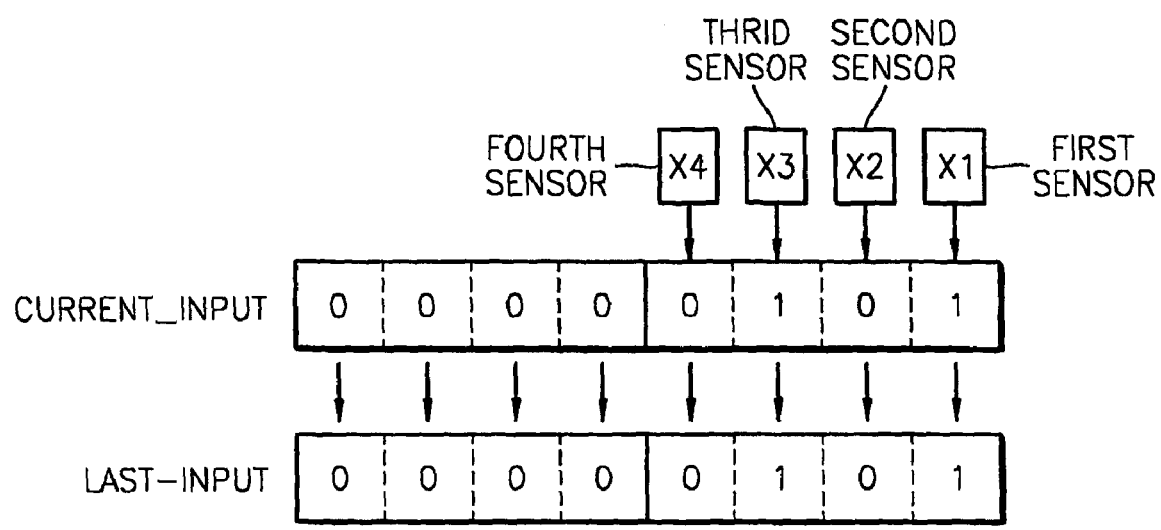
FIG. 15B is a conceptual view for explaining how to obtain the Current_input and Last_input values in FIG. 15A.

Referring to FIG. 15A, the pre-processing unit 130 initializes variables (step S1501), more specifically, setting the values of Transition_Counter and Input_Counter to '0'.

Next, the pre-processing unit 130 inputs a current port value into Current_Input and a previous port value into Last_Input (step S1502). The pre-processing unit 130 sequentially arranges values captured from N ports at urrent time and stores them in Current_Input. Here, N refers to the number of sensors worn on the fingers or the number of click signals. In a present embodiment, N is 4. For example, as shown in FIG. 15A, if current port values outputted from the first sensor X1, the second sensor X2, the third sensor X3, and the fourth sensor X4 correspond to 1, 0, 1, 0, the pre-processing unit 130 stores 0000 0101 in Current_Input. The pre-processing unit 130 then sets Last_Input to Current_Input and initializes a timer.

Next, the pre-processing unit 130 determines whether a value in Transition_Counter is less than the threshold value Ntc in step S1503. The threshold value Ntc may be 60, which indicates steps S1504 through S1510 are repeated 60 times. If Transition_Counter value is less than the threshold value Ntc, the pre-processing unit 130 proceeds to step S1504. Otherwise, the pre-processing unit 130 proceeds to B.

In step S1504, The pre-processing unit 130 captures current port values and stores the captured current port values in Current_Input.

Figure 15C:
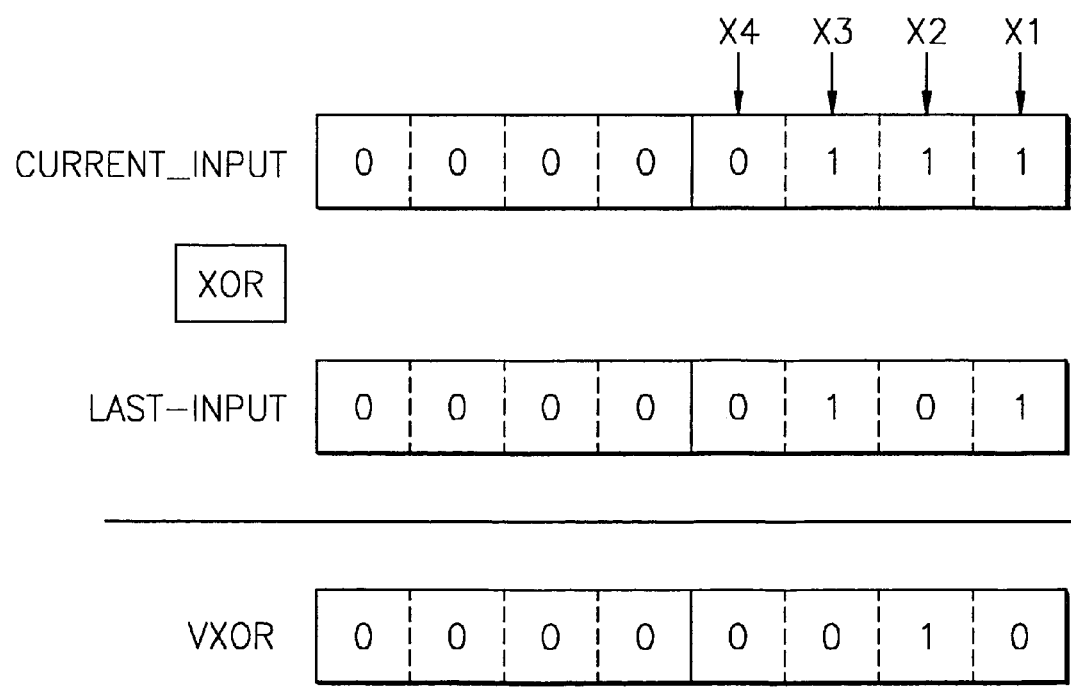
FIG. 15C is a conceptual view for explaining how to obtain VXOR, which indicates changes between the currently and previously used values in FIG. 15A.

In step S1505, the pre-processing unit 130 performs signal combination to determine whether there is any change between the current port values and the previous port values. The pre-processing unit 130 stores the results of an XOR operations of Last_Input, values and Current_Input values. In a variable of VXOR as shown in FIG. 15C. It is assumed that Current_Input and Last_Input store values of 0000 0111 and 0000 0101, respectively. After XOR operated between the values of Current_Input and Last_Input, it is known that bits of the second sensor X2 have a change. Because an operation result of '0' indicates no bit change and '1' does a bit change. Consequently, a value of 0000 0010 is stored in VXOR.

Next, in step S1506, the pre-processing unit 130 determines whether the VXOR value is '0' in step S1506.

If the VXOR value is '0', there is no change between the current port values and the previous port values, indicating that any edge (rising edge or falling edge) is not triggered in any sensor signal. Therefore, the pre-processing unit 130 proceeds to step S1510 and sets Last_input to Current_Input and proceeds to step S1503.

Figure 15D:
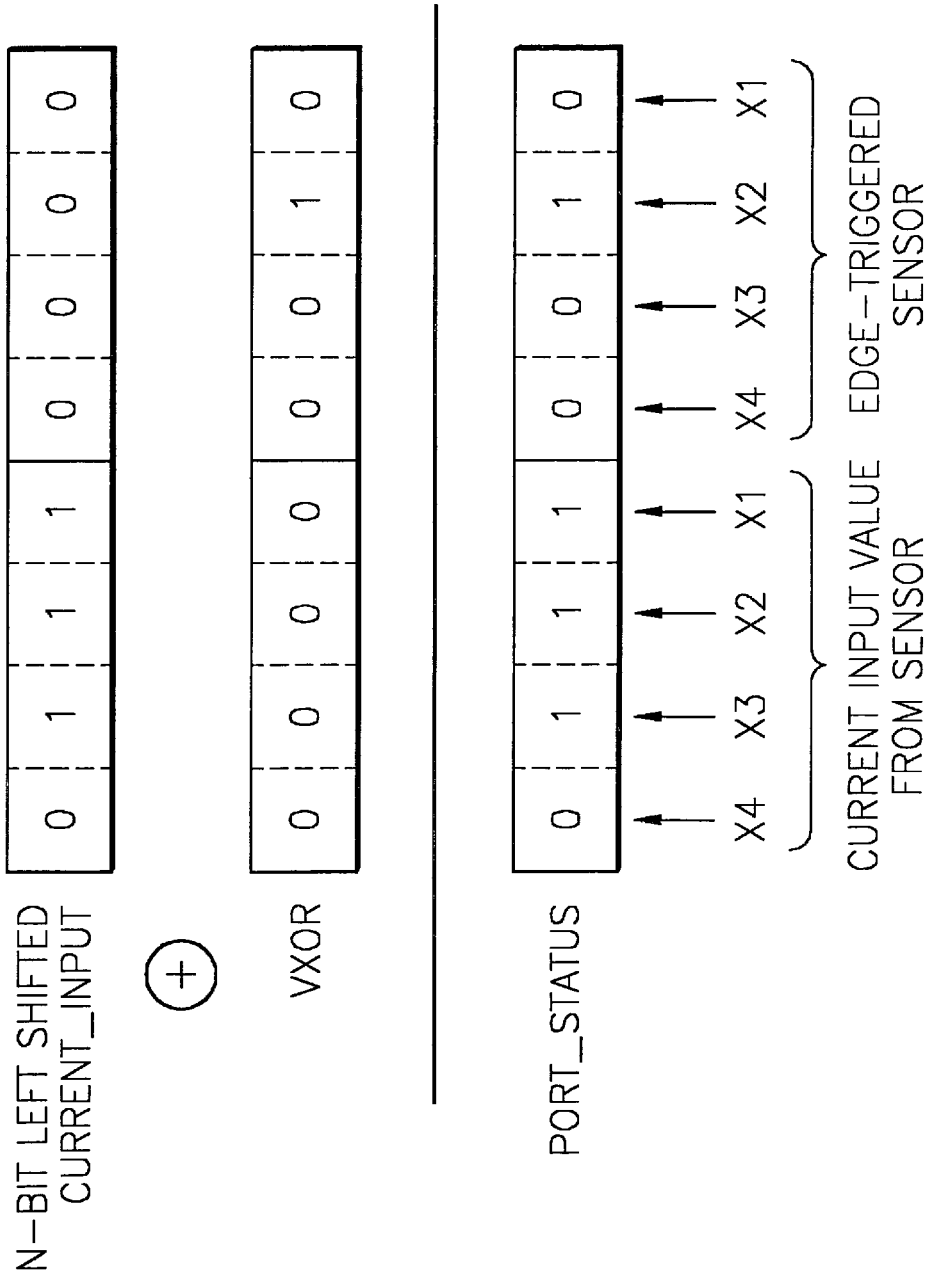
FIG. 15D is a conceptual view for explaining how to obtain Port_Status in FIG. 15A.

If the VXOR value is not '0', the pre-processing unit 130 manipulates its variables by increasing the Transition_Counter value by 1, adding the VXOR value to a value of N-bit left shifted Current_Input value, and storing the added result in Port_Status [Input_Counter] (step S1507). As shown in FIG. 15D, the Current_Input value of 0000 0111 is 4-bit left shifted to the result 0111 0000. If 0000 0010 of the VXOR value is added to the left shifted Current_Input value, 0111 0010 is stored in Port_Status [Input_Counter]. The first four bits of the 8-bit Port_Status indicate current sensor values, and the remaining four bits indicate an edge-triggered. In FIG. 15D, the Port_Status value indicates the current sensor values of [X1 X2 X3 X4] are [1 1 1 0], and the edge-triggered-sensor is X2.

In step S1507, the pre-processing unit 130 stores a current timer value in Event_Time[Input_Counter] in step S1507.

In step S1508, the pre-processing unit 130 increases Input_Counter by 1.

In step S1509, the pre-processing unit 130 determines whether the Input_Counter value is greater than a threshold value Nic. The threshold Nic value may be set to 23.

If the Input_Counter value is greater than the threshold value Nic, the pre-processing unit 130 proceeds to B. If the Input_Counter value is less than or equal to the threshold value Nic, the pre-processing unit 130 stores the Current_Input value in Last_Input in step S1510 and proceeds to step S1503.

As a result of the operations shown in FIG. 15A, the data table of FIG. 15E is obtained, with the information: Input_Counter, Current_Input which stores the current port value; Last_Input which stores the previous port value; VXOR which indicates a change in the current port value or the previous port value; Transition_Counter; Port_Status which indicates the current port value and information on a change-stricken, namely an edge-triggered port; and Event_Time which represents the time when the edge is triggered. For example, in FIG. 15E, at current time when Transition_Counter is 12, the current port value is 1010, the change-stricken sensor is the third sensor, and the current timer value is 450.

Hereinafter, operations after B will be described with reference to FIG. 16A.

The operations after B include recognizing a sensor that does not operate normally based on the data of FIG. 15E and obtaining the predetermined number of the edge-triggered time, namely the timer values for a sensor that operates normally.

In step S1601, the pre-processing unit 130 sets Bit_Mask as 0000 0001 and count as '0'.

In step S1602, the pre-processing unit 130 determines whether the count value is less than N (step S1602). Step S1602 for determining whether the operations hereinafter are performed as many as the number of sensors worn on fingers.

If the count value is less than N, the pre-processing unit 130 proceeds to step S1603, otherwise, the pre-processing unit 130 proceeds to F.

In steps S1603 and S1604, the pre-processing unit 130 sets Edge_Counter to '0' and Port_Status_Counter to '0'.

In step S1605, the pre-processing unit 130 determines whether the Port_Status_Counter value is less than a value of Input_Counter+1. If the Port_Status_Counter value is not less than the value of Input_Counter+1, the pre-processing unit 130 proceeds to 'D'. In step S1612, the Port_Status_Counter value is increased sequentially by 1. Input_Counter may store a value of 23. That the Port_Status_Counter value is not less than the value of Input_Counter+1 means an Edge_Counter alue is possibly smaller than 2 (step S1611). And also, only the Port_Status_Counter value gets increased by 1 (step S1612), which results excess of the Input_Counter value. That is, no more than two edges have been triggered in a sensor signal outputted from a sensor for a predetermined amount of time, indicating the sensor does not operate normally. Therefore, the pre-processing unit 130 proceeds to 'D' and stores the error value in the output variable.

If the Port_Status_Counter value is less than the value of Input_Counter+1, the pre-processing unit 130 determines whether the result of an AND_bit operation of Port_Status [Port_Status_Counter] and Bit_Mask is '0' in step S1606. AND_bit denotes the bit-wise AND operation. Referring to FIG. 16B, an AND_bit operation of Port_Status[3] having 1110 0001 (with reference to the data table of FIG. 15E) and Bit_Mask having 0000 0001 results in the value '1'. Since the result is not '0', the pre-processing unit proceeds to step S1607.

The pre-processing unit 130 then proceeds to store an Event_Time[Port_Status_Counter] alue in Time[Edge_Counter] in step S1607 and determines whether the Edge_Counter value is '0' in step S1608.

Unless the Edge_Counter value is '0', the pre-processing unit 130 increases the Edge_Counter value by 1 in step S1610. If the Edge_Counter value is '0', in step S1609, the pre-processing unit 130 performs the AND_bit operation of Port_Status[Port_Status_Counter] and N-bit left shifted Bit_Mask, storing the AND_bit operation result in Init_Edge_Status. For example, as shown in FIG. 16C, the AND_bit operation of Port_Status having 1110 xxxx and N-bit left shifted Bit_Mask, 0001 0000 results out '0'. The pre-processing unit 130 stores '0' in Init_Edge_Status.

In step S1610, the pre-processing unit increases the Edge_Counter value by 1.

Next, in step S1611, the pre-processing unit 130 determines whether the Edge_Counter value is greater than '2', a satisfactory value for calculating a duty ratio of the sensor signal.

If the Edge_Counter value is greater than 2, the pre-processing unit 130 proceeds to 'C'. If the Edge_Counter value is not greater than 2, the pre-processing unit 130 increases the Port_Status_Counter value by 1 in step S1612 and proceeds to step S1605.

Figure 16A:
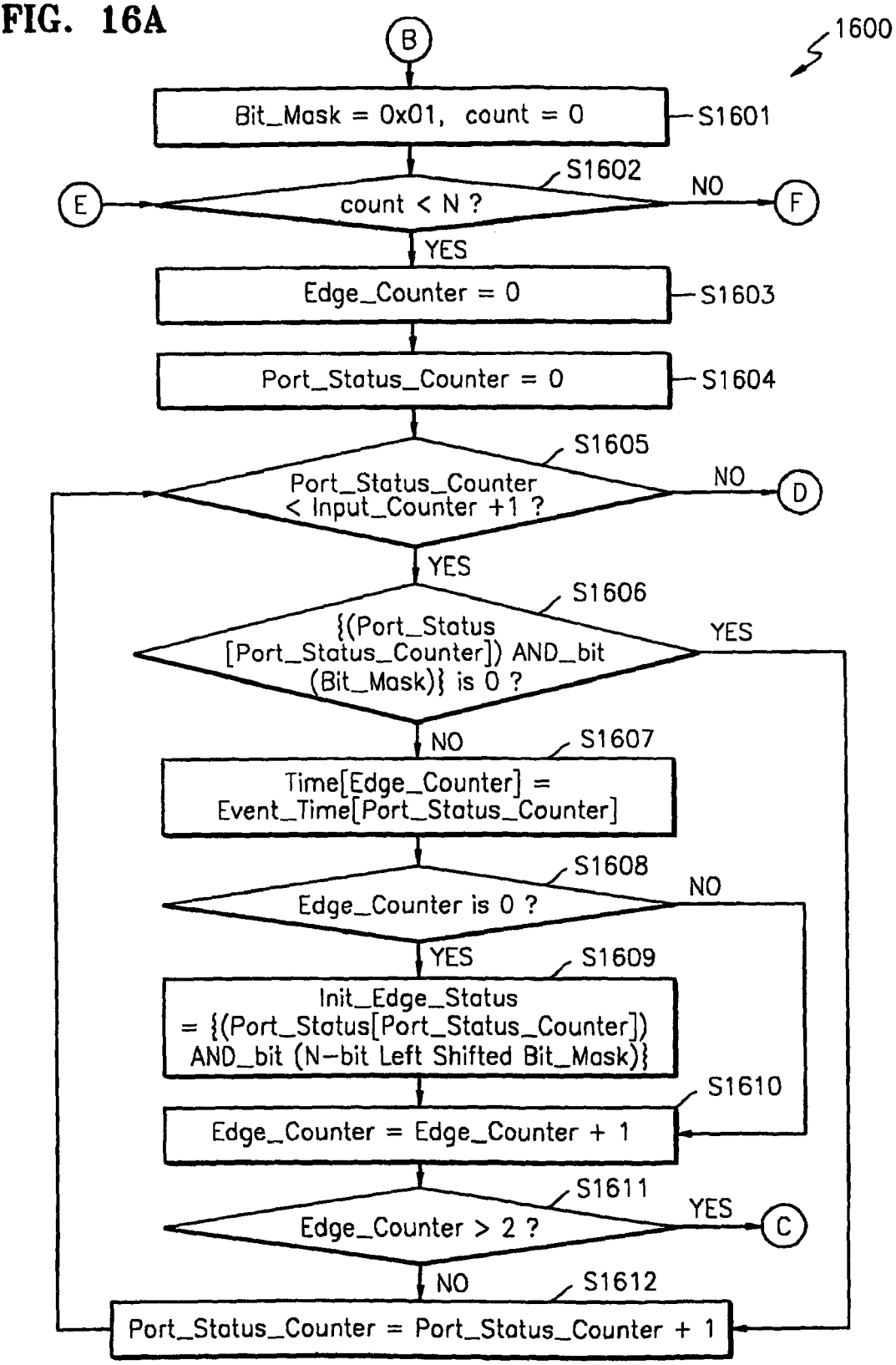
FIG. 16A is a detailed flowchart of an algorithm for a recognition procedure on whether a user is wearing the 3D input device in FIG. 12.
Figure 16B:
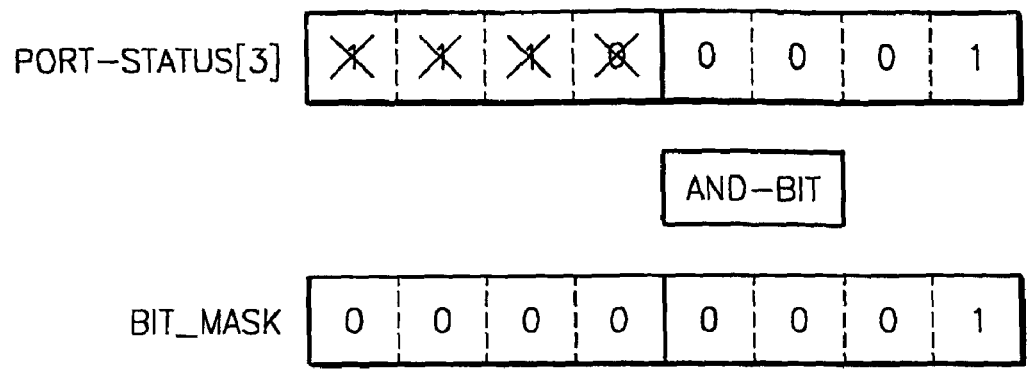
FIG. 16B is a conceptual view for explaining And-Bit operation of Port-Status with Bit-Mask in FIG. 16A.
Figure 16C:
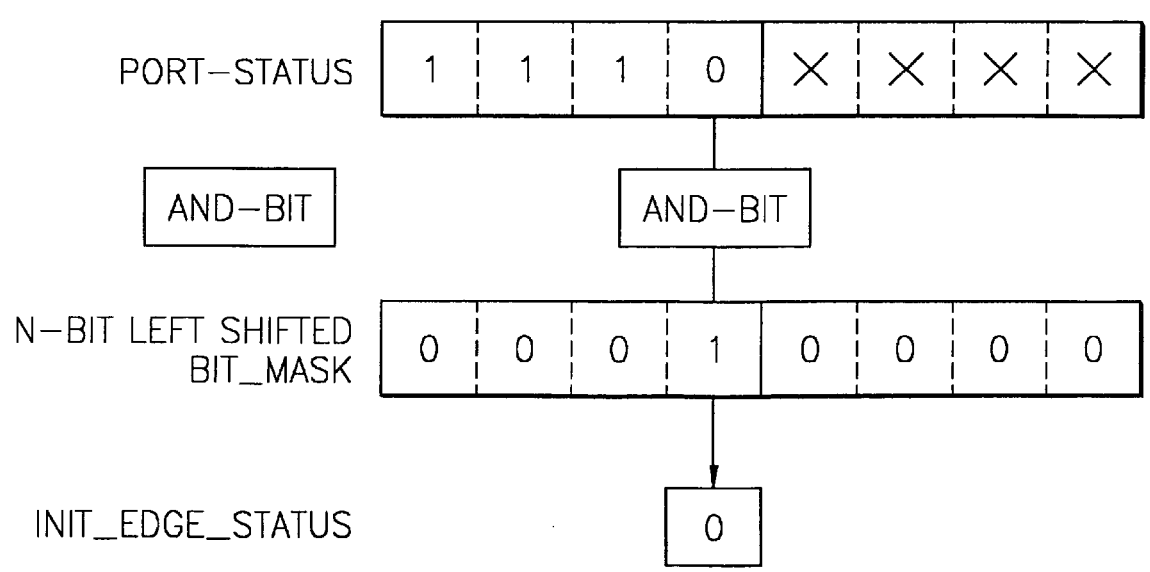
FIG. 16C is a conceptual view for explaining how to obtain Init_Edge_Status of FIG. 16A.

Operating the values in the data table of FIG. 15E according to the algorithm of FIG. 16A produces the values in the data table of FIG. 16D. Each sensor obtains values for Init_Edge_Status, Time[0], Time[1], and Time[2]. For example, in a case of the first sensor X1, as shown in FIG. 15E, when a port value for the first sensor X1 is '1' corresponding Transition_Counter values are '3', '7', and '11', and corresponding Event_Time values are 130, 280, and 430. In FIG. 16D, the Init_Edge_Status value of the first sensor X1 is '0' based on the current port signal of Port_Status [3]. This information is stored in FIG. 16D. However, it is noted that FIG. 16D shows information when all sensors X1, X2, X3, and X4 operate normally.

Figure 17:
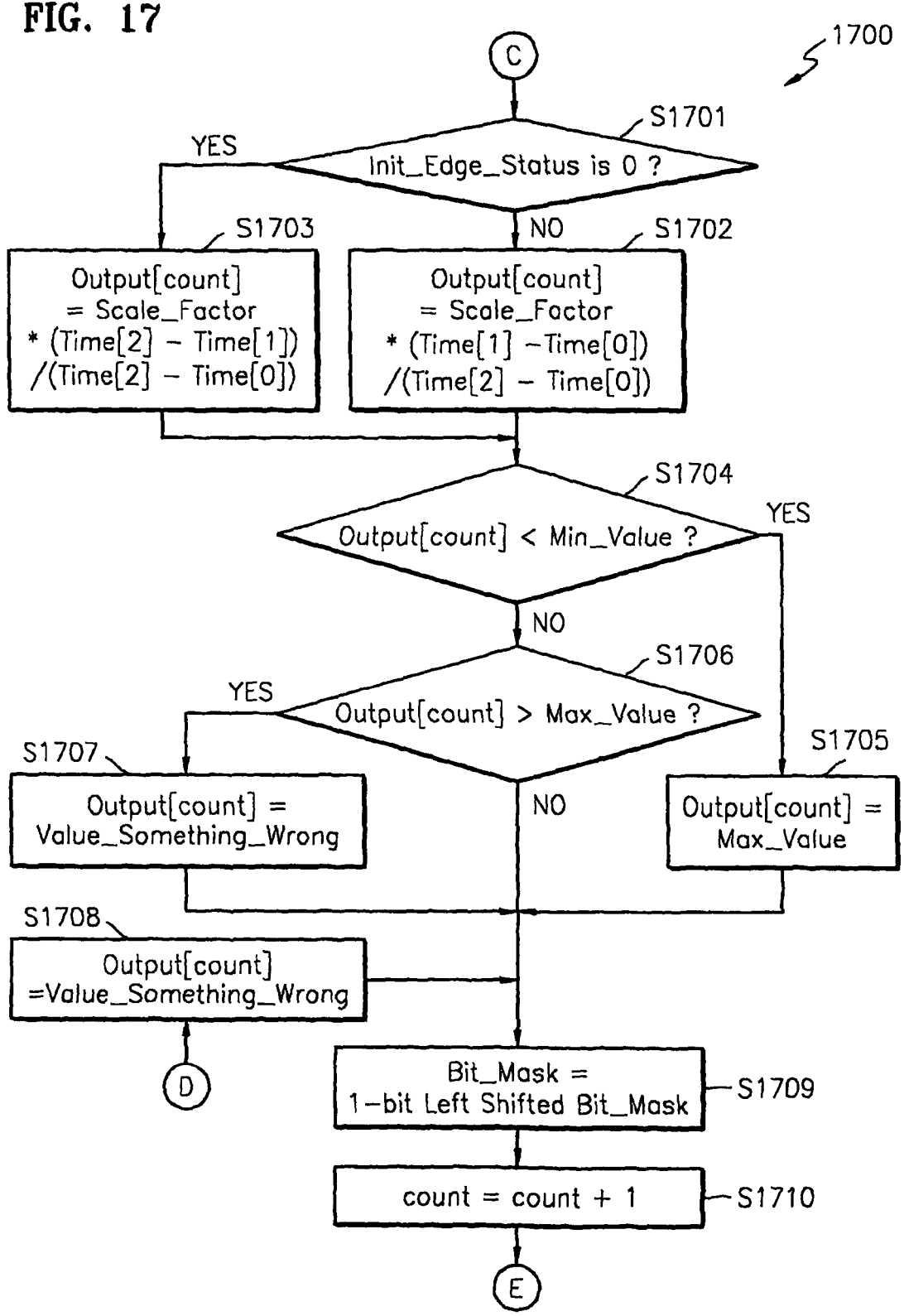
FIG. 17 is a detailed flowchart of an algorithm for calculating the duty ratio in FIG. 12.

Hereinafter, operations after 'C' will be described with reference to FIG. 17.

In the first step S1701, the pre-processing unit 130 determines whether the Init_Edge_Status value is '0' (step S1701). Reflecting the determination result, a duty ratio for the sensor signal is calculated. If the Init_Edge_Status value is not '0', the pre-processing unit 130 stores Scale_Factor*(Time[1]-Time[0])/(Time[2]-Time[0]) in an output variable Output [count] (step S1702). If Init_Edge_Status is '0', the pre-processing unit 130 stores Scale_Factor*(Time[2]-Time[1])/(Time[2]-Time[0]) in the output variable Output[count] (step S1703). Scale_Factor is for signal transmission. For example, if a calculated output value is to be transmitted in an 8-bit signal, the output variable value may be in a range 0-225. Thus, for example, the Scale_actor value may be 225.

The pre-processing unit 130 determines whether the value of the output variable Output[count] is less than Min_Value, e.g., '1', in step S1704. If so, the pre-processing unit 130 stores Min_Value in the output variable Output[count] (step S1705) and proceeds to step S1709.

Otherwise, the pre-processing unit 130 determines whether the output variable Output[count] value is greater than Max_Value, e.g., '255' (step S1706). If so, the pre-pocessing unit 130 stores Value_Something_Wrong in the output variable Output[count] (step S1707), and proceeds to step S1709.

In D, the pre-processing unit 130 stores Value_Something_Wrong in the output variable Output[count] in step 1708, and proceeds to step S1709. Since the output variable value stored according to the duty ratio calculation may have from Min_Value of '1' o Max_Value of '225', Value_Something_Wrong may be '0', which is not used as the output variable alue.

In step S1709, the pre-processing unit 130 shifts Bit_Mask to left direction by 1 bit and stores the result in Bit_Mask.

Next, the pre-processing unit 130 increases count by 1 in step S1710, and proceeds to 'E'.

Figure 18A:
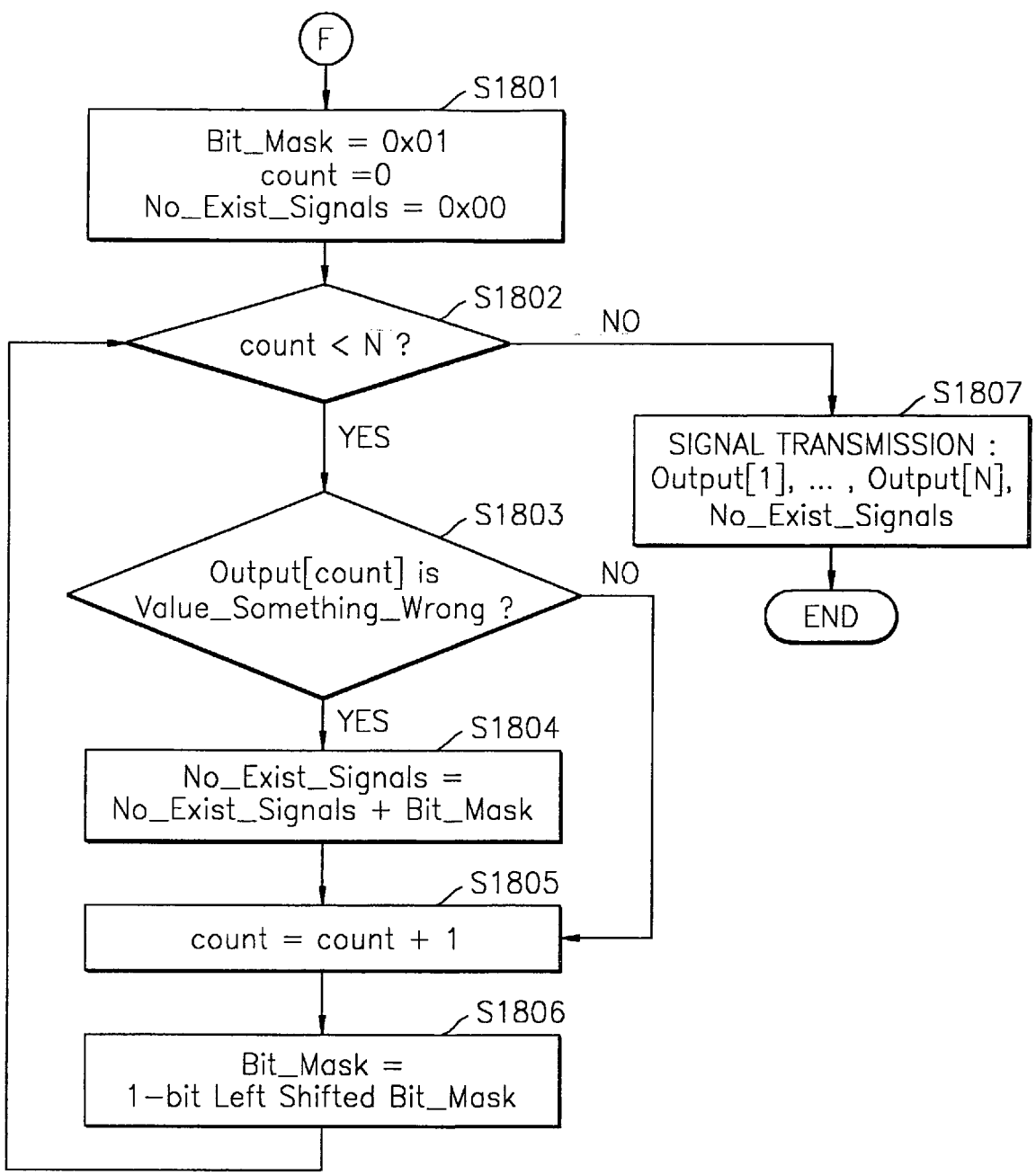
FIG. 18A is a detailed flowchart of an algorithm for transmitting the signal values in FIG. 13.

Hereinafter, operations after F will be described with reference to FIG. 18A.

In step S1801, the pre-processing unit 130 sets the Bit_Mask value to 0000 0001, count value to 0, and No_Exit_Signals value to 0000 0000.

Next, in step S1802, the pre-processing unit 130 determines whether the count value is less than N. The count value greater than or equal to N means all operations in the pre-processing unit 130 have been completed. In this case, the pre-processing unit 130 proceeds to step S1807.

If the count value is less than N, the pre-processing unit 130 determines whether Output[count] has Value_Something_Wrong in step S1803.

If output[count] does not have Value_Something_Wrong, the pre-processing unit 130 proceeds to step S1805 and increases the count value by 1.

Figure 18B:
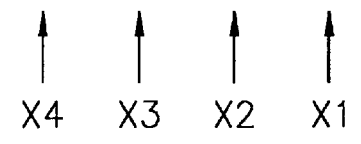
FIG. 18B is a conceptual view for explaining how to obtain No_Exist_Signals in FIG. 18A.
Figure 19:
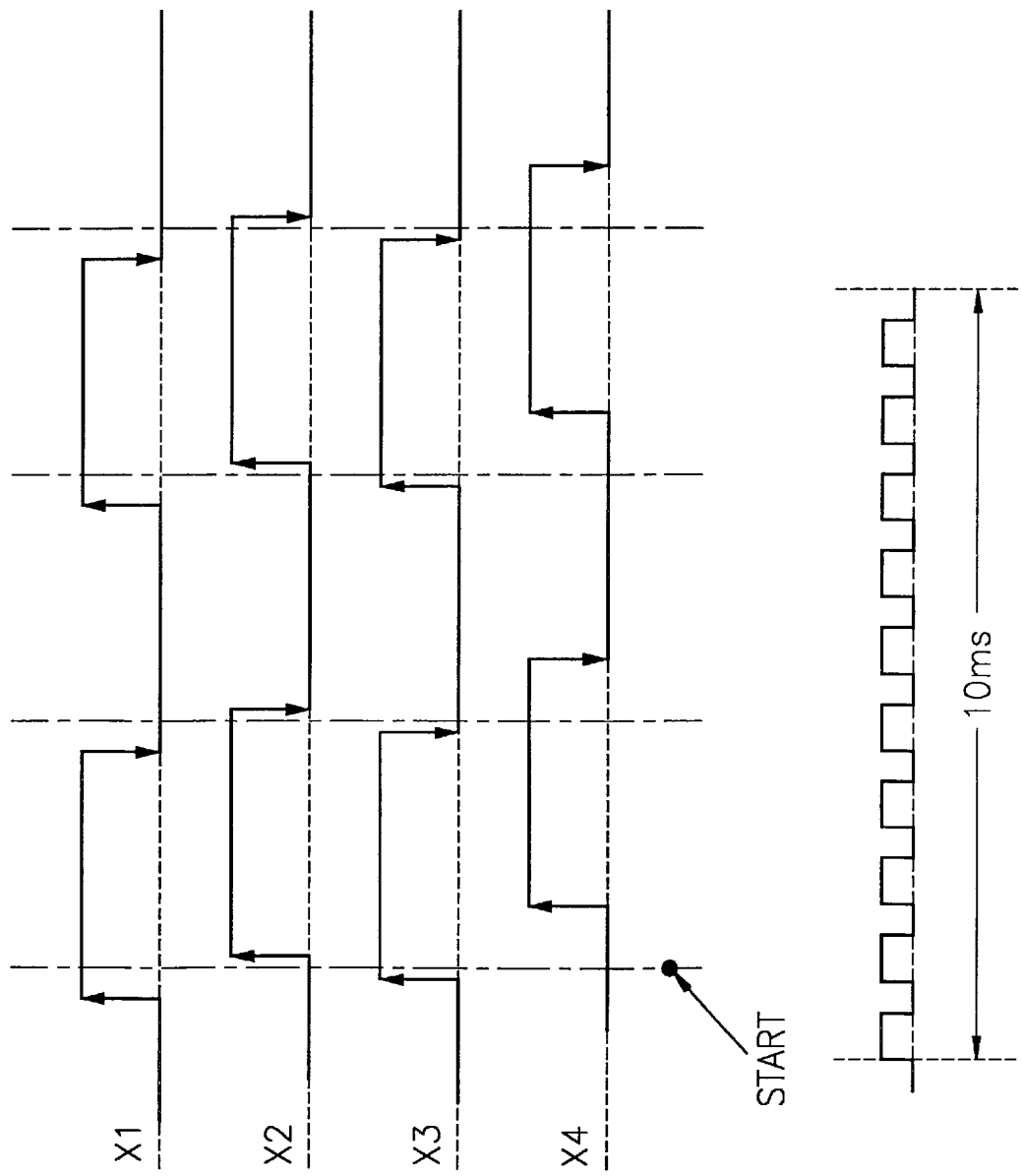
FIG. 19 illustrates sensor signals when all sensors X1, X2, X3, and X4, which are attached to the finger elements, operate normally.
Figure 20:
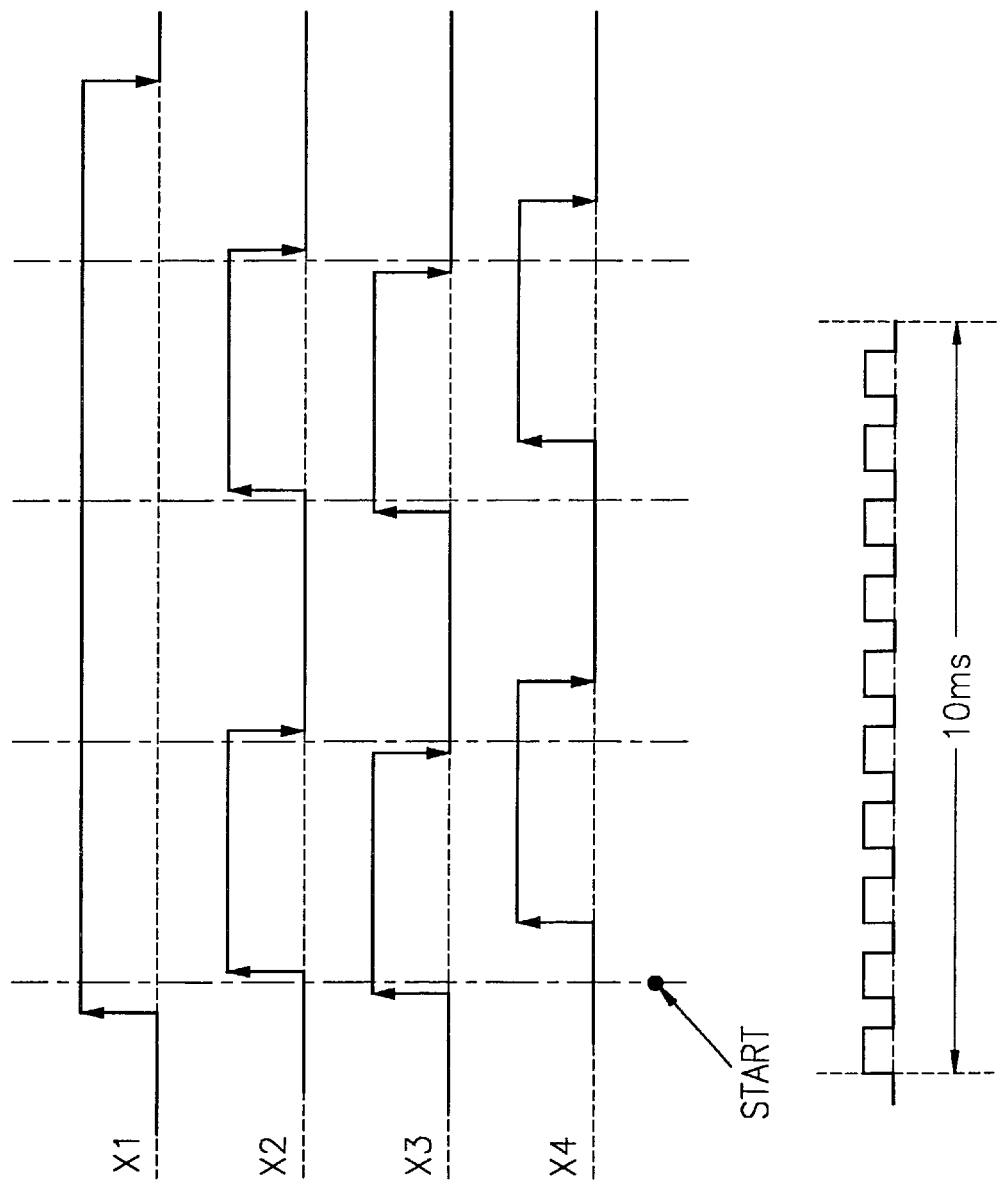
FIG. 20 illustrates a sensor output signal when the sensor X1 operates abnormally.

If output[count] has Value_Something_Wrong, the pre-processing unit 130 stores the summation result of a value of No_Exist_Signals (variable indicating the number of existing signals) and the Bit_Mask value in No_Exist_Signals in step S1804. For example, as shown in FIG. 18B, if Bit_Mask having 0000 0001 is added to No_Exist_Signals having 0000 0000, the summation result, 0000 0001, is stored in No_Exist_Signals. No_Exist_Signals having 0000 0001 indicates that the first sensor X1 is not operating normally or is not being worn by the user.

Next, in step S1806, the pre-processing unit 130 shifts Bit_Mask to left direction by 1 bit, stores the result in Bit_Mask, and proceeds to step S1802.

In step S1807, the pre-processing unit 130 transmits Output[1], . . . , Output[n], No_Exist_Signals to the signal processing unit 140. For example, if output[1], output[2] and No_Exist_Signals=[0000 1100] are outputted that the first sensor X1 and the second sensor X2 are not being worn by a user, and the third sensor X3 and the fourth sensor X4 are being worn by the user.

Thus, it is possible for the pre-processing unit 130 to recognize the sensors being worn by the user and those not being worn by the user.

According to the present invention, it is possible to implement a user-friendly 3D input device by automatically or manually configuring the 3D input device.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of configuring a three-dimensional (3D) information input device which performs information input operations using a plurality of finger devices that are worn by a user and senses the user's finger movement, the method comprising steps of:
obtaining movement signals output from each of the finger devices and recognizing finger positions of the finger device representing positions of fingers by which the finger device are worn; and
adaptively configuring the 3D input device corresponding to signals which are provided from the plurality of the finger devices worn by a user, by using information of the recognized finger positions of the finger device;
wherein the adaptively configuring the 3D input device comprises determining the number of fingers on which the plurality of devices are worn and assigning differing configurations to the input device based on the number of fingers which are wearing a finger device; and
wherein the result of the input operation is determined by a combination of the finger positions and the assigned configuration of the input device.

2. The method of claim 1, wherein adaptively configuring the 3D input device comprises:
adaptively configuring a signal-processing unit, which processes movement signals sensed by the finger device, based on the recognition results; and
adaptively configuring a device driver of the 3D input device based on the recognition results and basic set-up information used for information input.

3. The method of claim 2, wherein the basic set-up information includes input scenario information related to arrangement of information items that are selected by finger movement and a language used for information input.

4. The method of claim 2, wherein an application configures a soft keyboard based on the recognition results and the basic set-up information, when the application receives the recognition results and the basic set-up information from the device driver.

5. The method of claim 4, wherein the application outputs the configured soft keyboard to an output device.

6. The method of claim 5, wherein the soft keyboard displays finger positions of the finger device on an array of information items that are selected by finger movements.

7. The method of claim 1, wherein the recognizing finger positions of the finger device comprises recognizing the position of each of a plurality of fingers.

8. The method of claim 1 further comprising:
receiving reset information, used for reconfiguration of the 3D information input device, from a user through a user interface; and
reconfiguring a device driver of the 3D input device based on the received reset information.

9. The method of claim 8, wherein the reset information includes information about permission or cancel of use on a specific finger of the finger device, information about selection of an input scenario related to arrangement of information items that are selected by finger movement, and information about selection of the language used for information input.

10. The method of claim 8, wherein the user interface uses a control board of a Window system.

11. The method of claim 1, wherein the recognizing of whether the user is wearing the finger device and the recognizing of finger positions of the finger device comprises:
(a) acquiring sensor signals, which are used to sense movement of the finger device;
(b) determining, from the acquired sensor signals, whether at least the predetermined number of edges are detected; and
(c) recognizing whether the user is wearing the 3D input device based on the results of step (b).

12. The method of claim 11, wherein step (a) further comprises:
(a1) storing information about sensors experiencing changes between current sensor signal values and previous sensor signal values, and timer values at the time when the changes occur.

13. The method of claim 12, wherein step (b) further comprises:
determining whether at least the predetermined number of timer values are detected.

14. The method of claim 13, wherein step (c) further comprises:
if at least the predetermined number of timer values are detected, recognizing that the user is wearing the finger device with corresponding sensors outputting the acquired sensor signals attached thereto; and
unless at least the predetermined number of timer values are detected, recognizing that the user is not wearing the finger device with corresponding sensors outputting the acquired sensor signal.

15. The method of claim 14, wherein the method further comprises:
(d) if it is recognized that the user is not wearing the finger device, outputting information indicating an error value; and
(e) if it is recognized that the user is wearing the finger device, calculating duty ratios by using the timer values, scaling the calculated duty ratios by a predetermined value and outputting the scaled values.

16. The method of claim 1, wherein the adaptively configuring the 3D input device includes deactivating algorithms on unworn finger device from among the plurality of finger devices.

17. A three-dimensional (3D) input device, which is adaptively configurable and performs information input operation using a plurality of finger devices that are worn by a user and senses the user's finger movement, the 3D input device comprising:
a pre-processing unit which obtains movement signals output from each of the finger devices and recognizes the finger positions of the finger device; and a signal-processing unit which is adaptively configured to process the movement signals output from the plurality of finger devices worn by the user corresponding to signals which are provided from the plurality of the finger devices worn by a user, by using information of the recognized finger positions of the finger device;

wherein the adaptively configuring the 3D input device comprises determining the number of fingers on which the plurality of devices are worn and assigning differing configurations to the input device based on the number of fingers which are wearing a finger device; and wherein the result of the input operation is determined by a combination of the finger positions and the assigned configuration of the input device.

18. The 3D input device of claim 17 further comprising a device driver, which is adaptively configured to process the movement signals output from the signal-processing unit based on the recognition result of the pre-processing unit and basic set-up information for information input.

19. The 3D input device of claim 18, wherein the basic set-up information includes a language used for information input and input scenario information related to arrangement of information items that are selected by the finger movement.

20. The 3D information input device of claim 19 further comprising an application, which configures a soft keyboard that displays the finger positions of the finger device on the arrangement of the information items that are selected by finger movement based on the recognition result and the basic set-up information received from the device driver.

21. The apparatus of claim 17 further comprising:
an application which receives reset information, used for reconfiguration of the 3D information input device, from a user through a user interface; and
a device driver which is reconfigured based on the reset information received from the application.

22. The apparatus of claim 21, wherein the reset information includes information about permission or cancel of use on a specific finger of the finger device, information about selection of an input scenario related to arrangement of information items that are selected by finger movement, and information about selection of the language used for information input.

23. The apparatus of claim 17, wherein the pre-processing unit comprises:
a signal acquiring unit which acquires sensor signals indicating movement of the finger device;
a port change recognizing unit which determines whether at least the predetermined number of edges are detected from the acquired sensor signals; and
a finger device recognizing unit which recognizes whether the user is wearing the finger device, based on the determination result of the port change recognizing unit.

24. The apparatus of claim 23, wherein the signal acquiring unit comprises:
a port status storing unit, which stores information about sensors with changes between current sensor signal values and previous sensor signal values; and
an event time storing unit which stores timer values set at the time of changes between the current sensor signal values and the previous sensor signal values.

25. The apparatus of claim 24, wherein the port change recognizing unit determines whether at least the predetermined number of timer values, stored in the event time storing unit, are detected.

26. The apparatus of claim 25, wherein the finger device recognizing unit recognizes that the user is wearing the finger device if at least the predetermined number of timer values are detected or recognizes that the user is not wearing the finger device if at least the predetermined number of timer values or less are detected.

27. The 3D input device of claim 17, wherein the signal-processing unit deactivates algorithms on unworn finger device from among the plurality of finger devices.

\* \* \* \* \*